United States Patent [19]

Greanias et al.

[11] Patent Number: 4,686,332

[45] Date of Patent: Aug. 11, 1987

[54] COMBINED FINGER TOUCH AND STYLUS DETECTION SYSTEM FOR USE ON THE VIEWING SURFACE OF A VISUAL DISPLAY DEVICE

[75] Inventors: Evon C. Greanias, Chevy Chase, Md.; C. Richard Guarnieri, Somers, N.Y.; John J. Seeland, Jr., Oakland Park, Fla.; Guy F. Verrier, Reston, Va.; Robert L. Donaldson, Annapolis, Md.

[73] Assignee: International Business Machines Corporation, Armonk, N.Y.

[21] Appl. No.: 878,949

[22] Filed: Jun. 26, 1986

[51] Int. Cl.[4] .............................................. G08C 21/00
[52] U.S. Cl. ...................................... 178/19; 340/706
[58] Field of Search ............................ 178/18, 19, 20; 340/706, 709; 324/207

[56] References Cited

U.S. PATENT DOCUMENTS

| | | | |
|---|---|---|---|
| 3,696,409 | 10/1972 | Braaten | 340/365 |
| 3,757,322 | 9/1973 | Barkan et al. | 340/365 C |
| 3,992,597 | 11/1976 | Hannula | 200/61.39 |
| 3,999,012 | 12/1976 | Dym | 178/18 |
| 4,009,338 | 2/1977 | Lowy et al. | 178/18 |
| 4,103,252 | 7/1978 | Bobick | 331/48 |
| 4,398,181 | 8/1983 | Yamamoto | 340/365 S |
| 4,582,955 | 4/1986 | Blesser | 178/19 |

Primary Examiner—Stafford D. Schreyer
Attorney, Agent, or Firm—John E. Hoel

[57] ABSTRACT

A combined finger touch and stylus detection system is disclosed for use on the viewing surface of the visual display device. Transparent conductors arranged in horizontal and vertical grid are supported on a flexible, transparent overlay membrane which is adaptable to a variety of displays. A unique interconnection pattern is provided between the transparent conductors in the array and buses which interconnect the conductors with the supporting electronics, whereby a minimum number of bus wires can be employed to service the array conductors and yet both unique finger touch location sensing and unique stylus location sensing can be accomplished. The system includes a control processor which operates on stored program instructions which, in a first embodiment provides for the alternate detection of either finger touch location or stylus location and, in a second embodiment, provides for the simultaneous detection of both finger touch location and stylus location. The resulting system provides the unique function of combined finger touch and stylus detection, is adaptable to a variety of display surfaces, is provided with a structure which is easily manufacturable, and which has an inherent long-term reliability.

10 Claims, 25 Drawing Figures

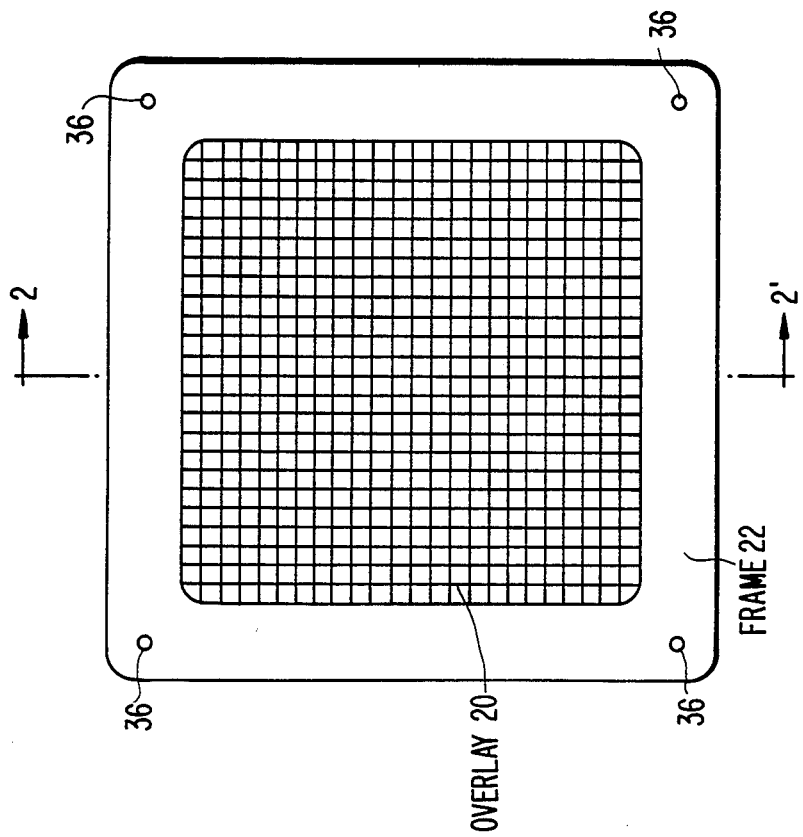
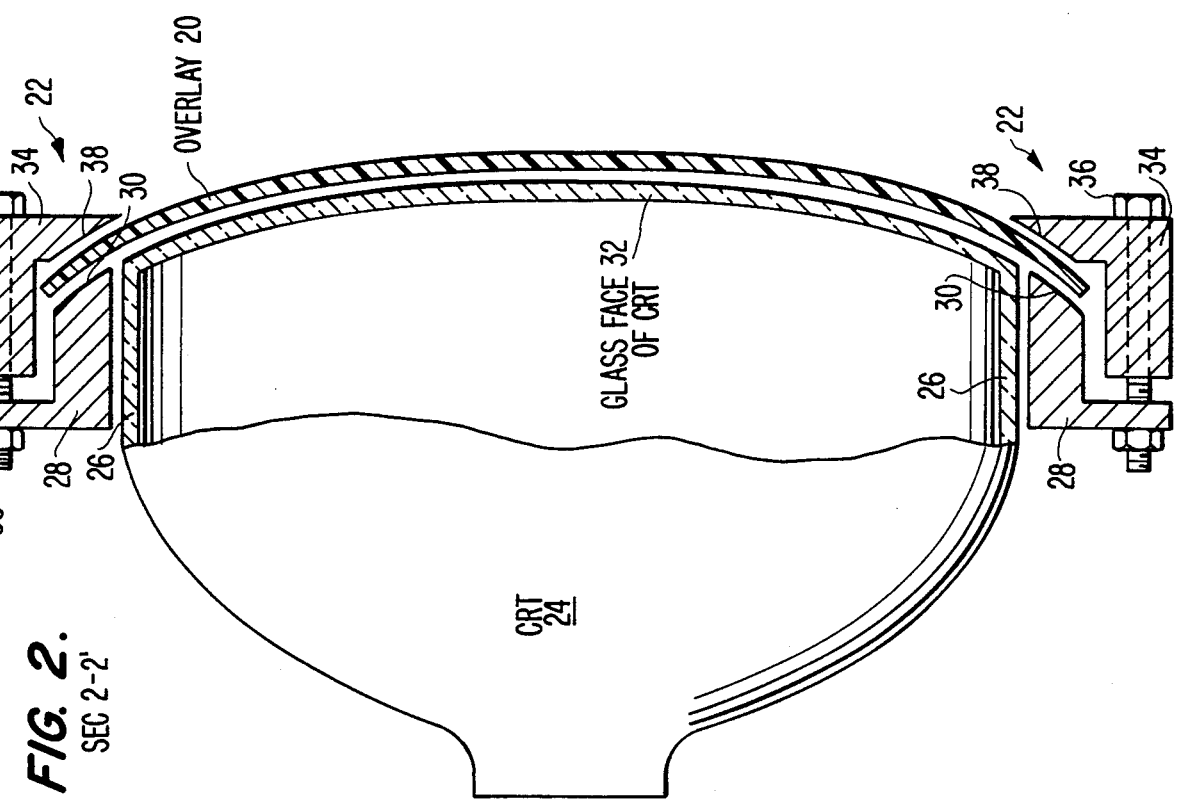

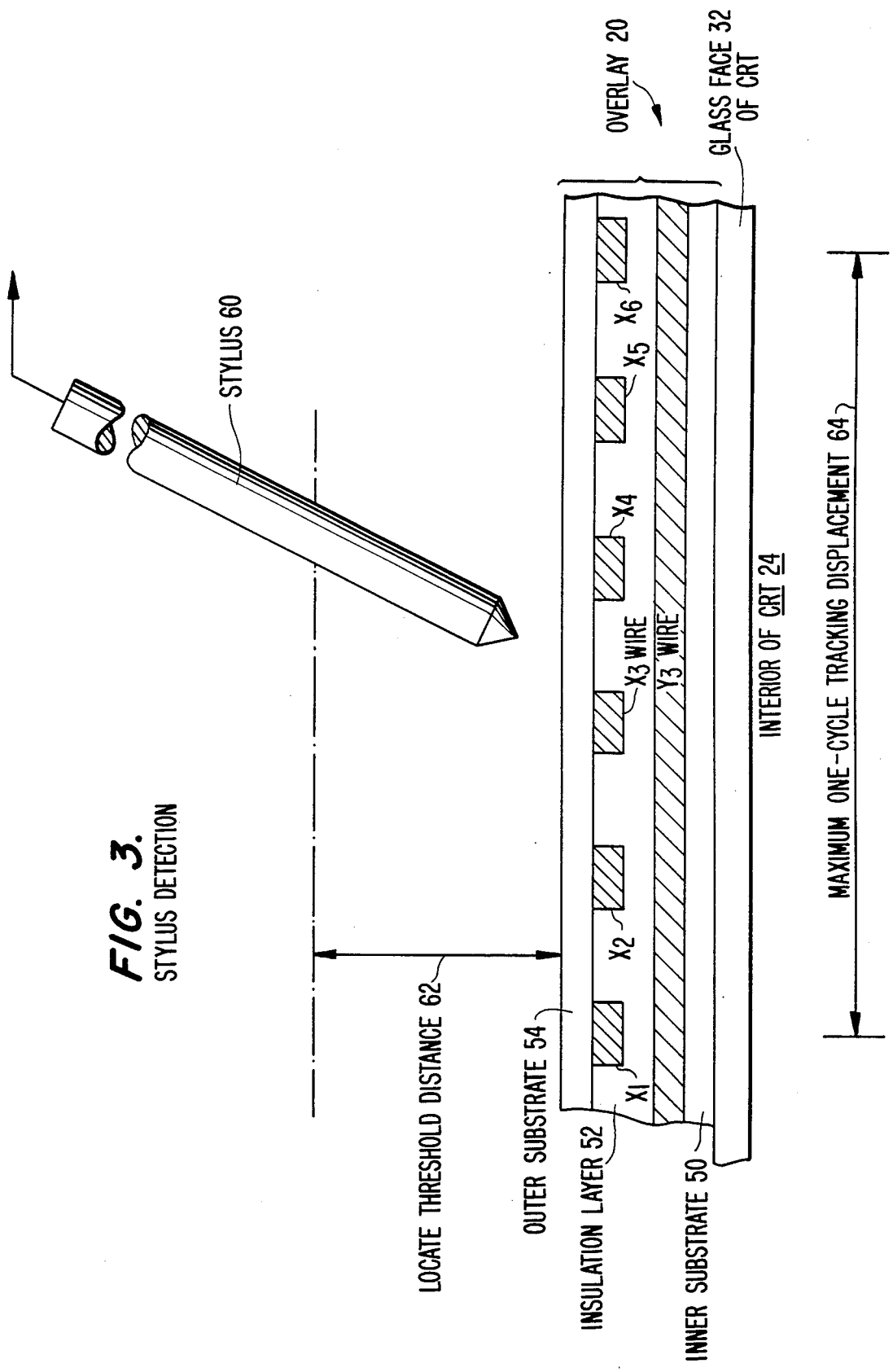

FIG. 4.

USING THE WIRE PAIR CONCEPT, THERE ARE THREE MEASUREMENTS THAT ARE
NEEDED TO DETERMINE THE PEN'S HEIGHT AND POSITION. THESE MEASUREMENTS ARE
CALLED P0, P1, AND P2.

TO MEASURE P0, CONSIDER THE DRIVE PATTERN FOR A WIRE PAIR:

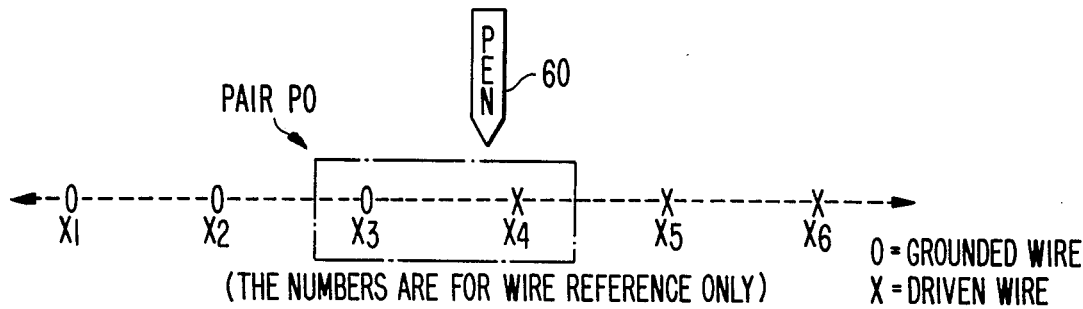

(THE NUMBERS ARE FOR WIRE REFERENCE ONLY)

O = GROUNDED WIRE
X = DRIVEN WIRE

FIG. 5.

IF THE PEN WERE MOVED ACROSS THE TABLET ALONG THIS AXIS WITH THIS DRIVE
PATTERN CONSTANT, THE MEASURED SIGNAL WOULD BE:

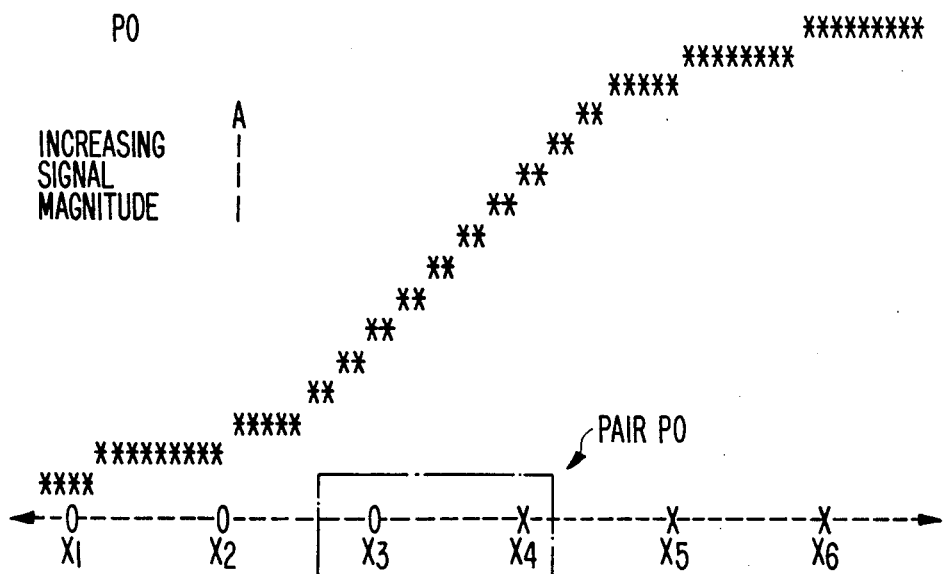

NOTE THAT WITHIN AND AROUND THE WIRE PAIR, THE PEN SIGNAL VARIES LINEARLY
WITH POSITION. THIS LINEARITY IS THE BASIS FOR ACCURATE INTERPOLATION
CALCULATIONS.

THE NEXT DATA, P1, IS FORMED BY SHIFTING THE PREVIOUS P0 PLOT TO THE RIGHT BY ONE WIRE:

THE FINAL DATA, P2, IS THE INVERSE OF P0. THAT IS, ALL OF THE WIRES BEING DRIVEN FOR P0 ARE GROUNDED FOR P2. SIMILARLY, THE GROUNDED WIRES FOR P0 ARE DRIVEN FOR P2. AS A RESULT, THE SIGNAL PATTERN FOR P2 IS THE MIRROR IMAGE OF P0 ABOUT THE WIRE PAIR MIDPOINT:

FINGER TOUCH DETECTION

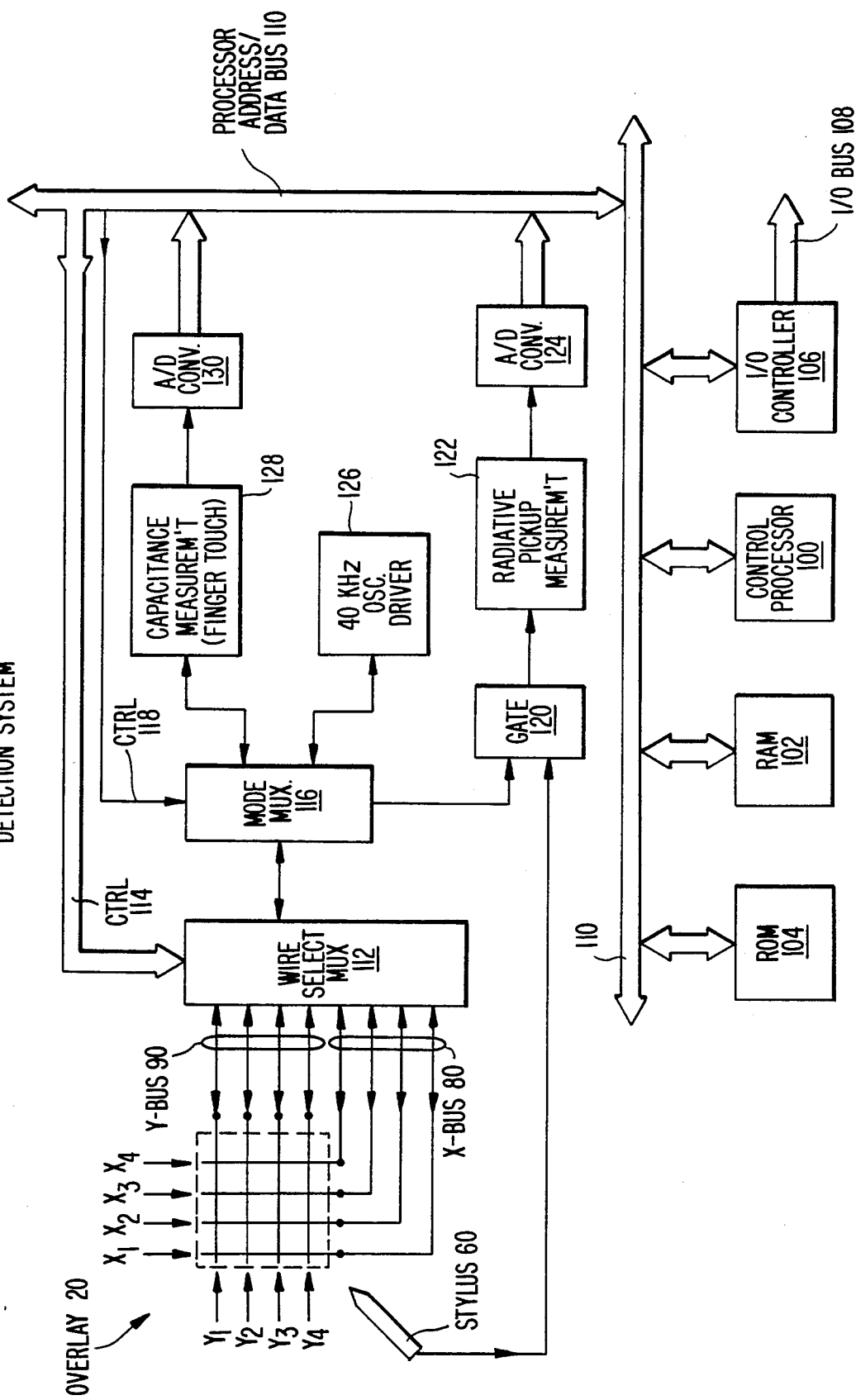
FIG. 9. DETECTION SYSTEM

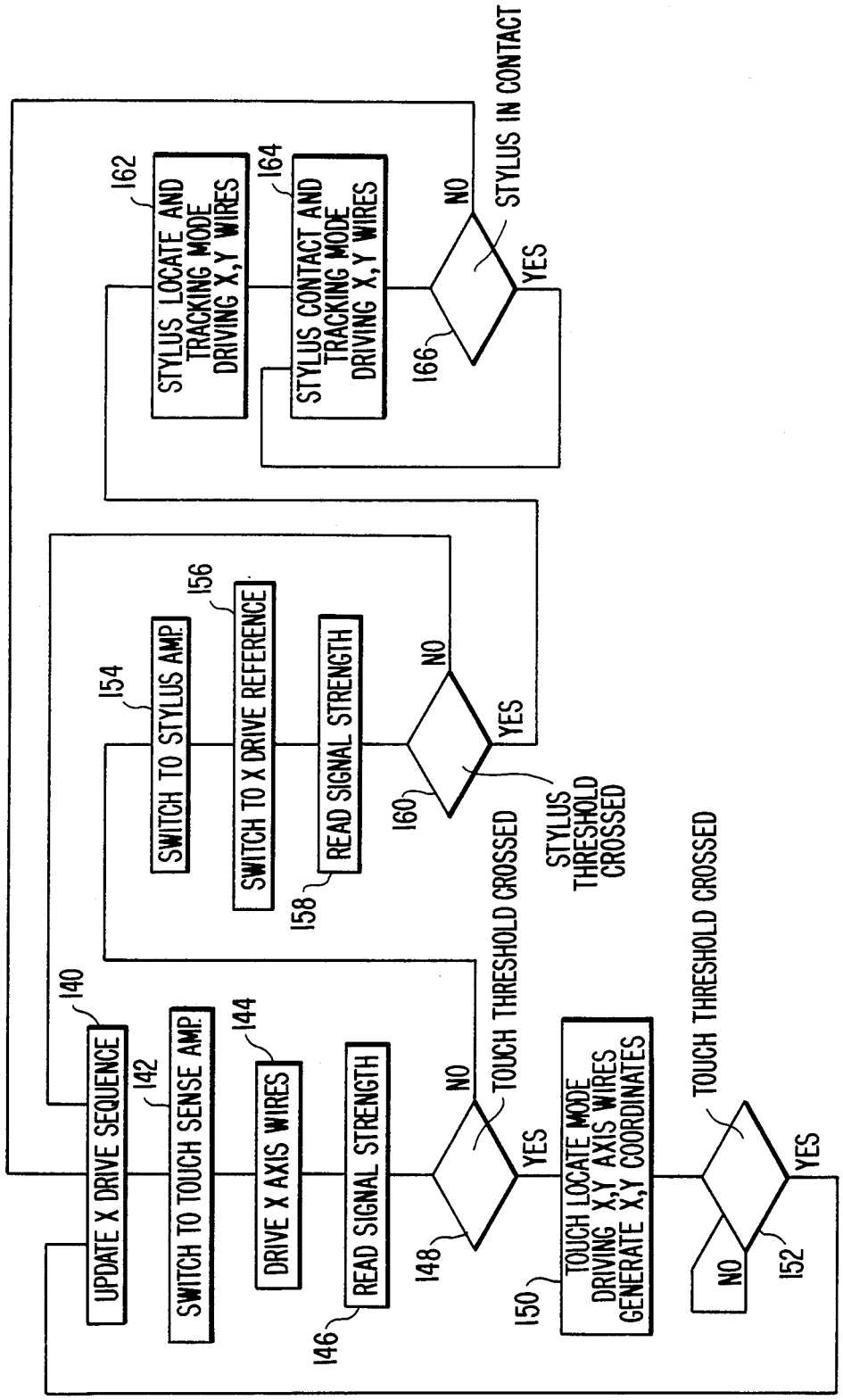

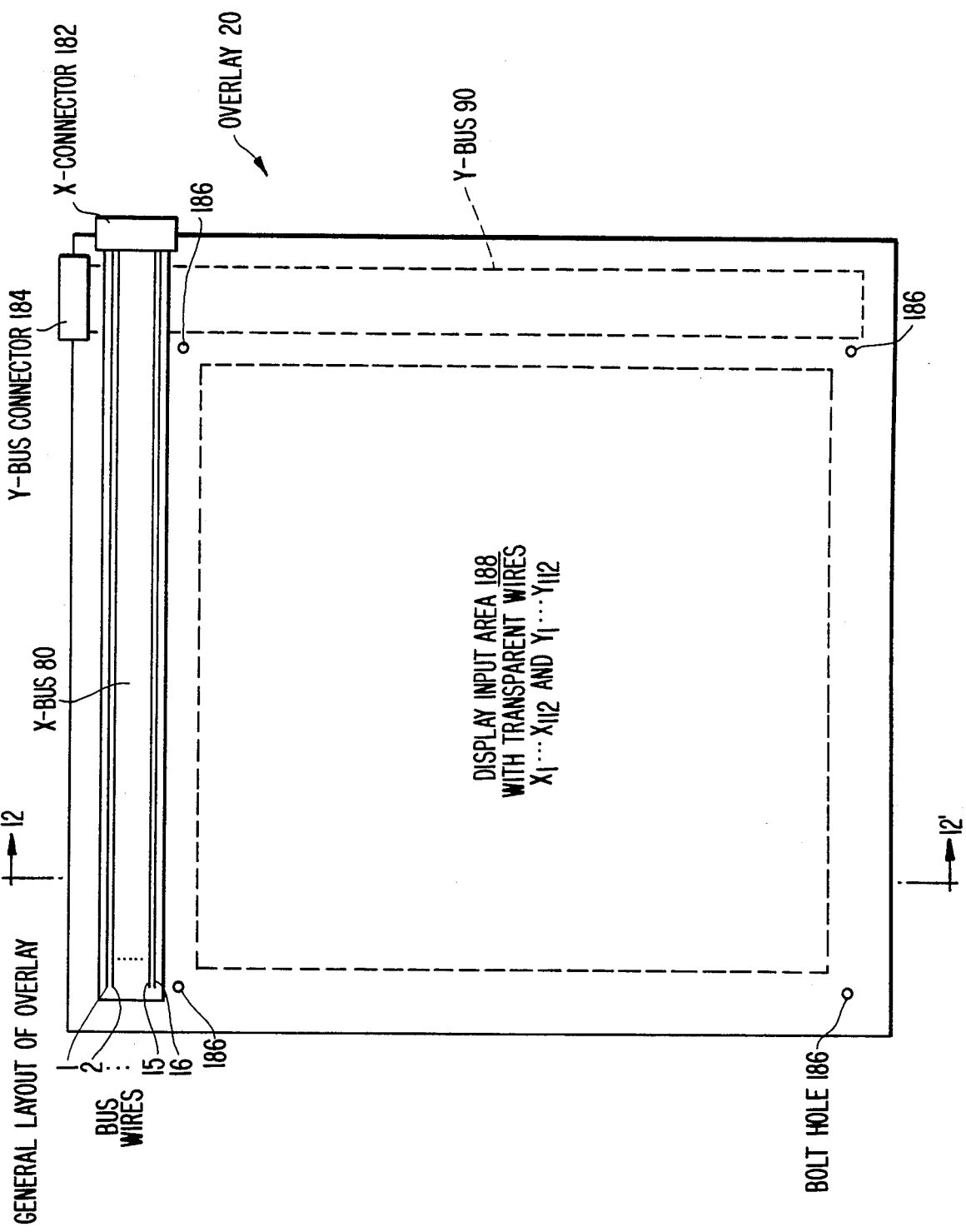
FIG. 11. GENERAL LAYOUT OF OVERLAY

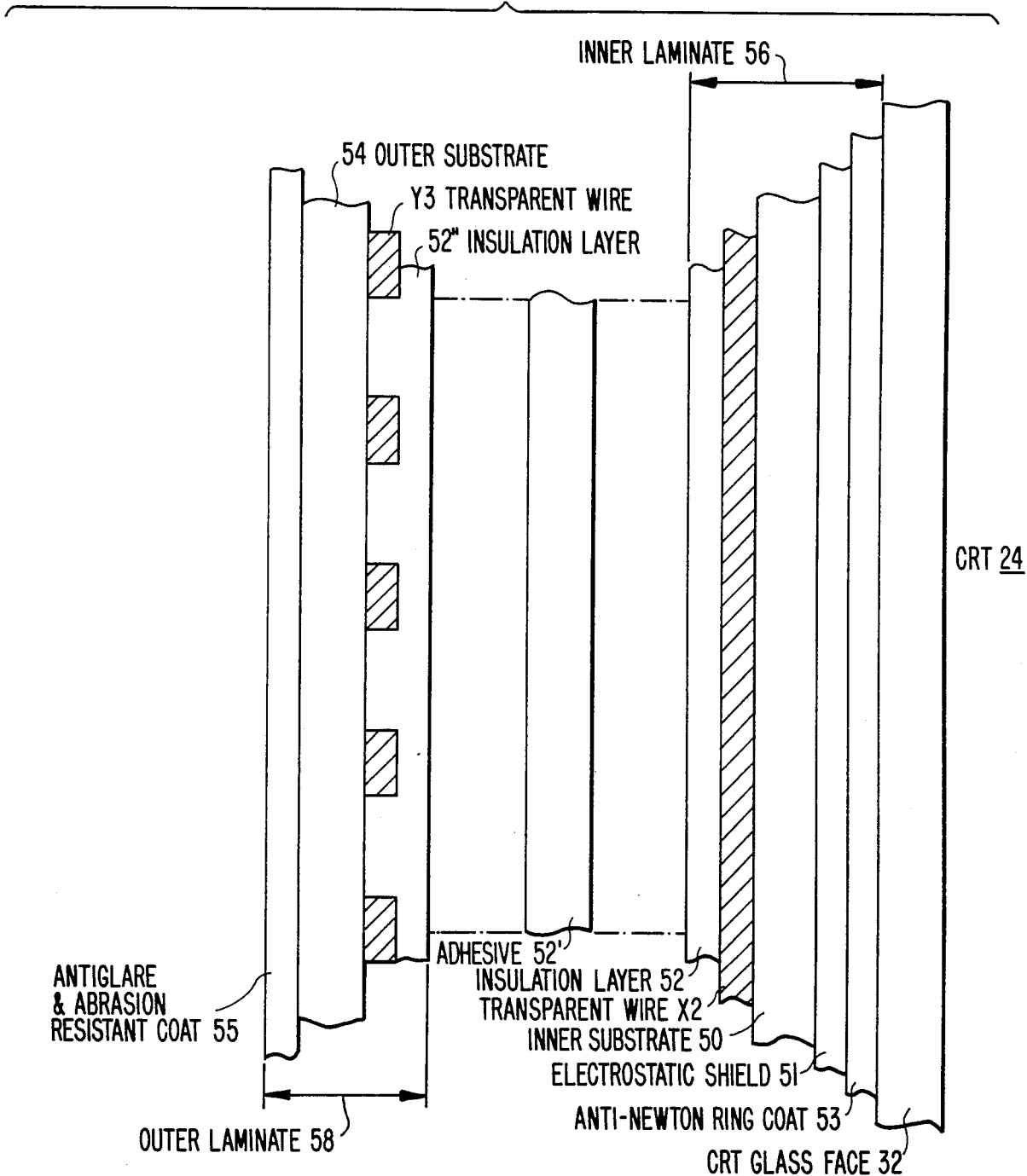

SEC 14-14'

X-BUS

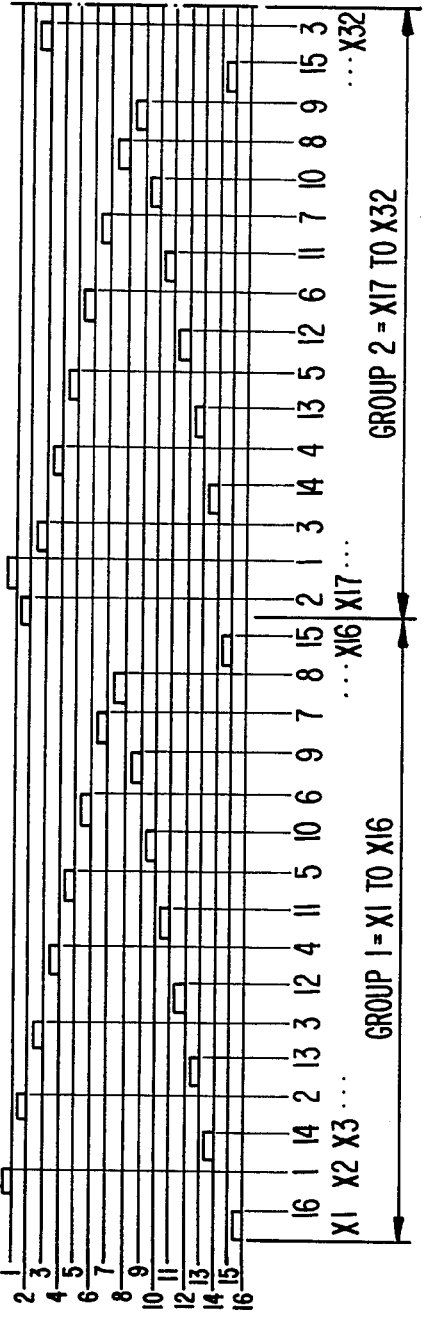
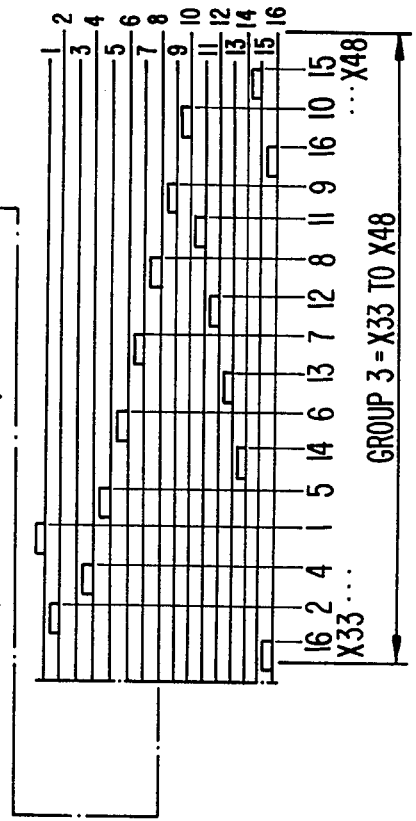
FIG. 15A.
BUS LAYOUT
FIG. 15.
| FIG. 15A. | FIG. 15B. | FIG. 15C. |

BUS LAYOUT

BUS LAYOUT

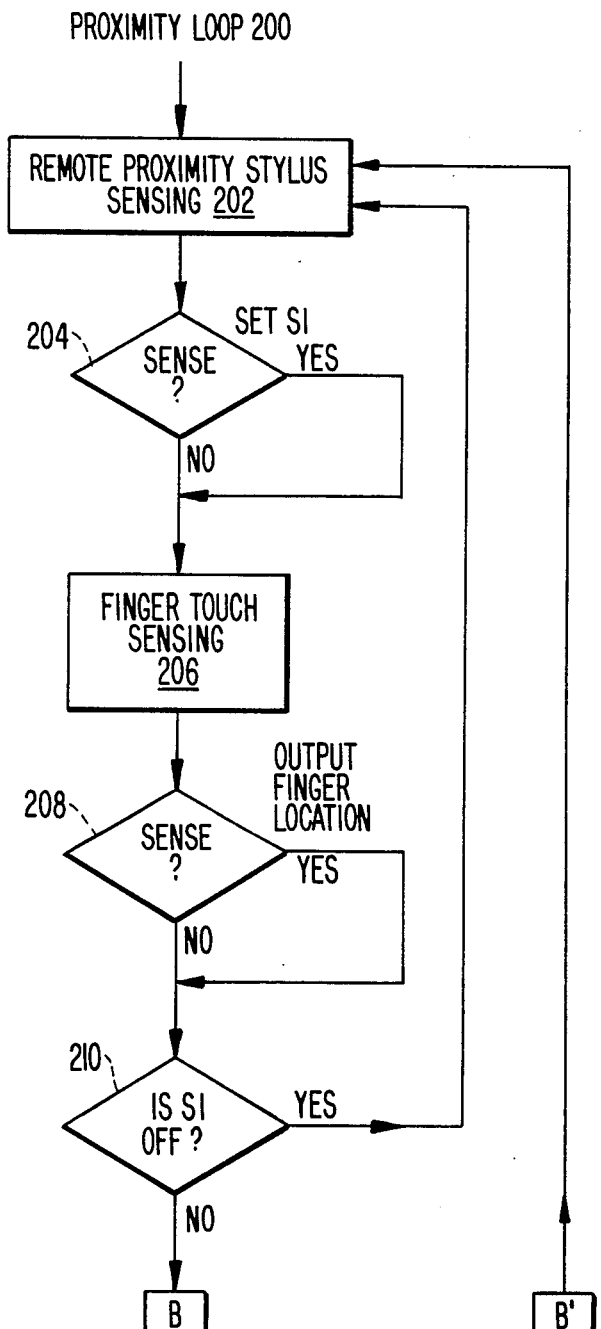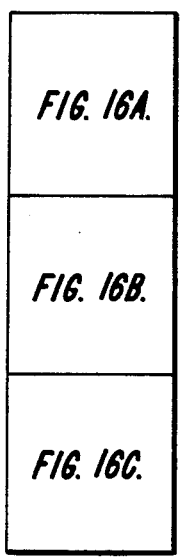

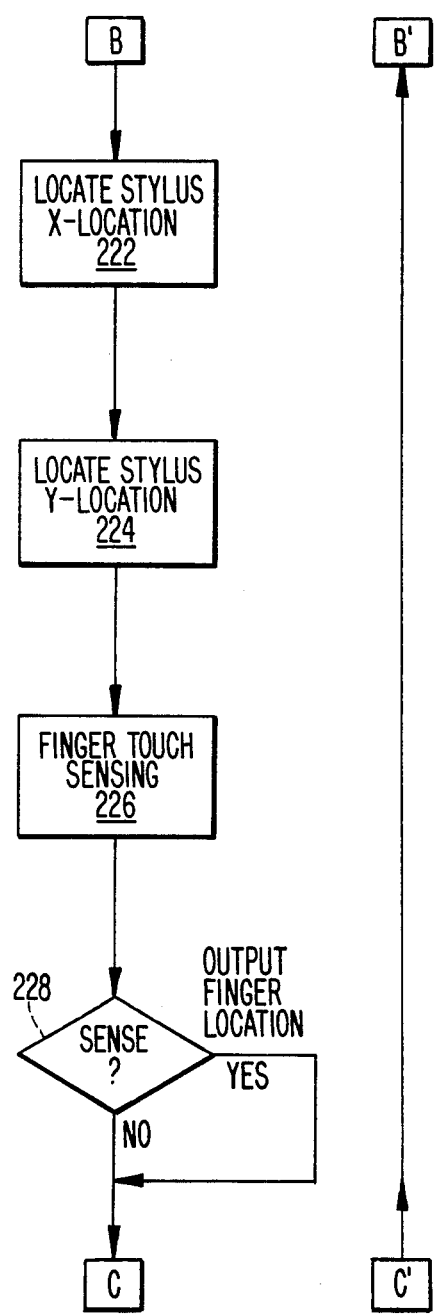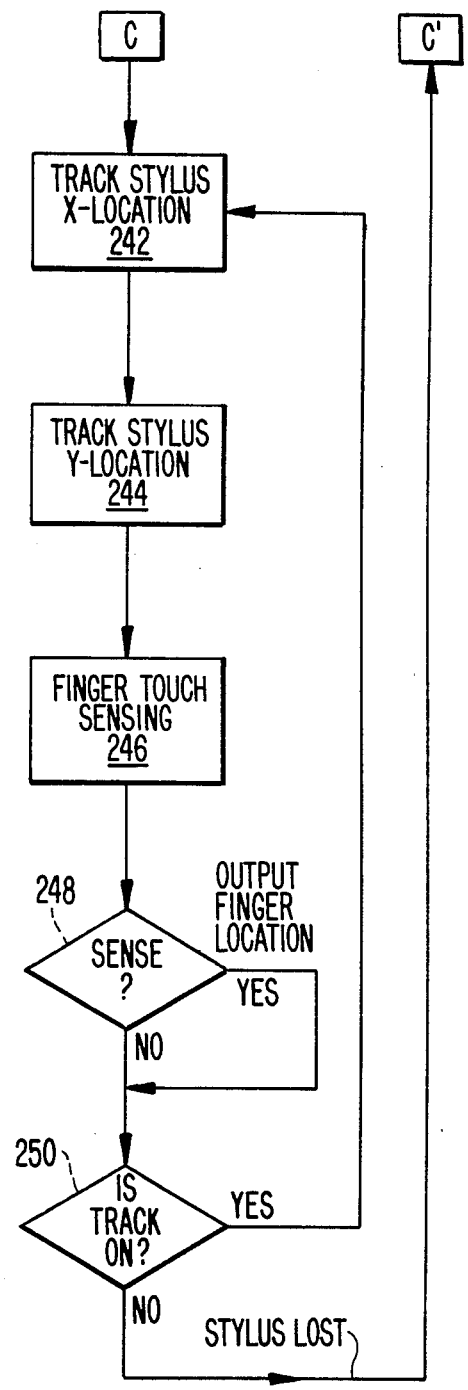

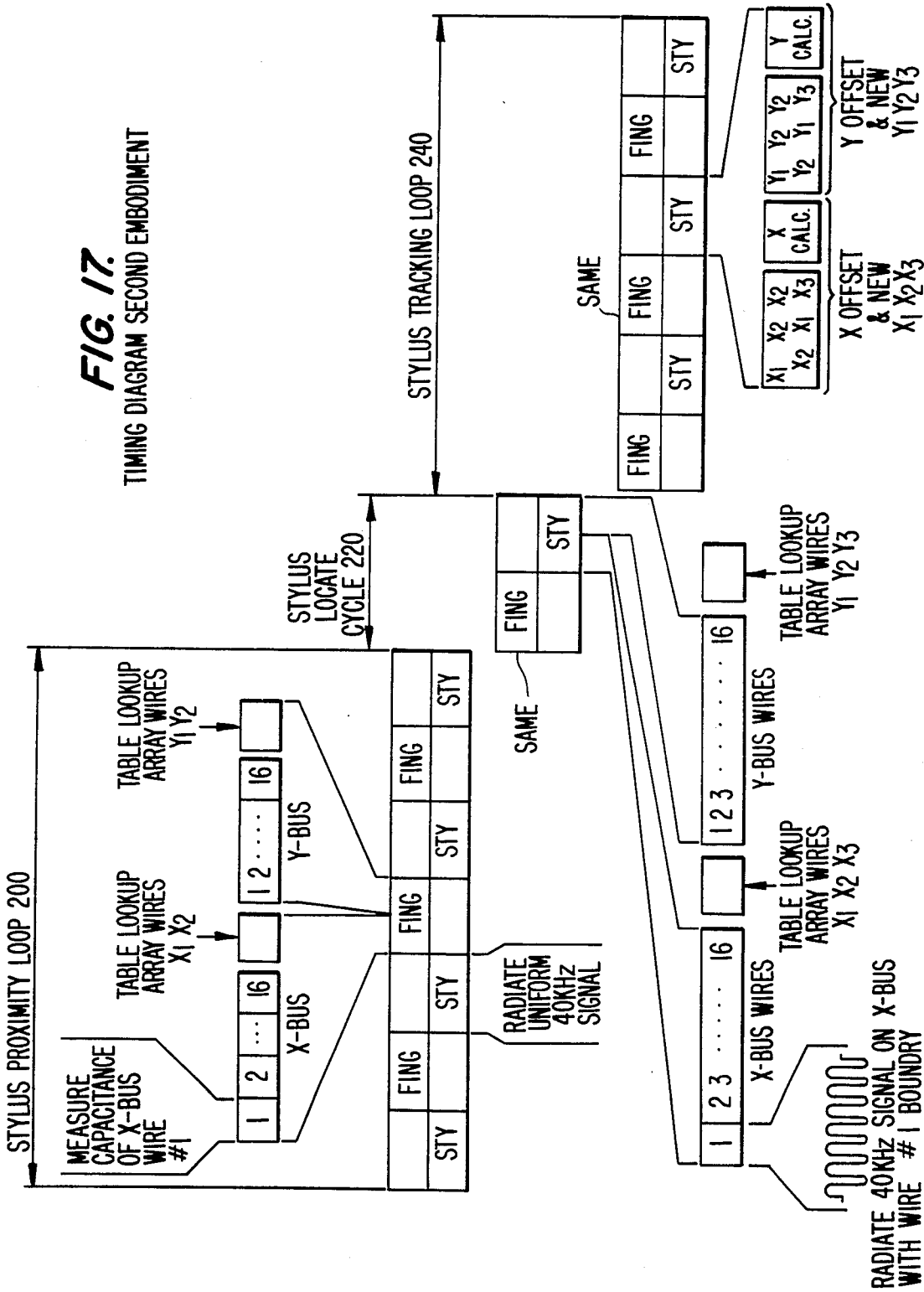

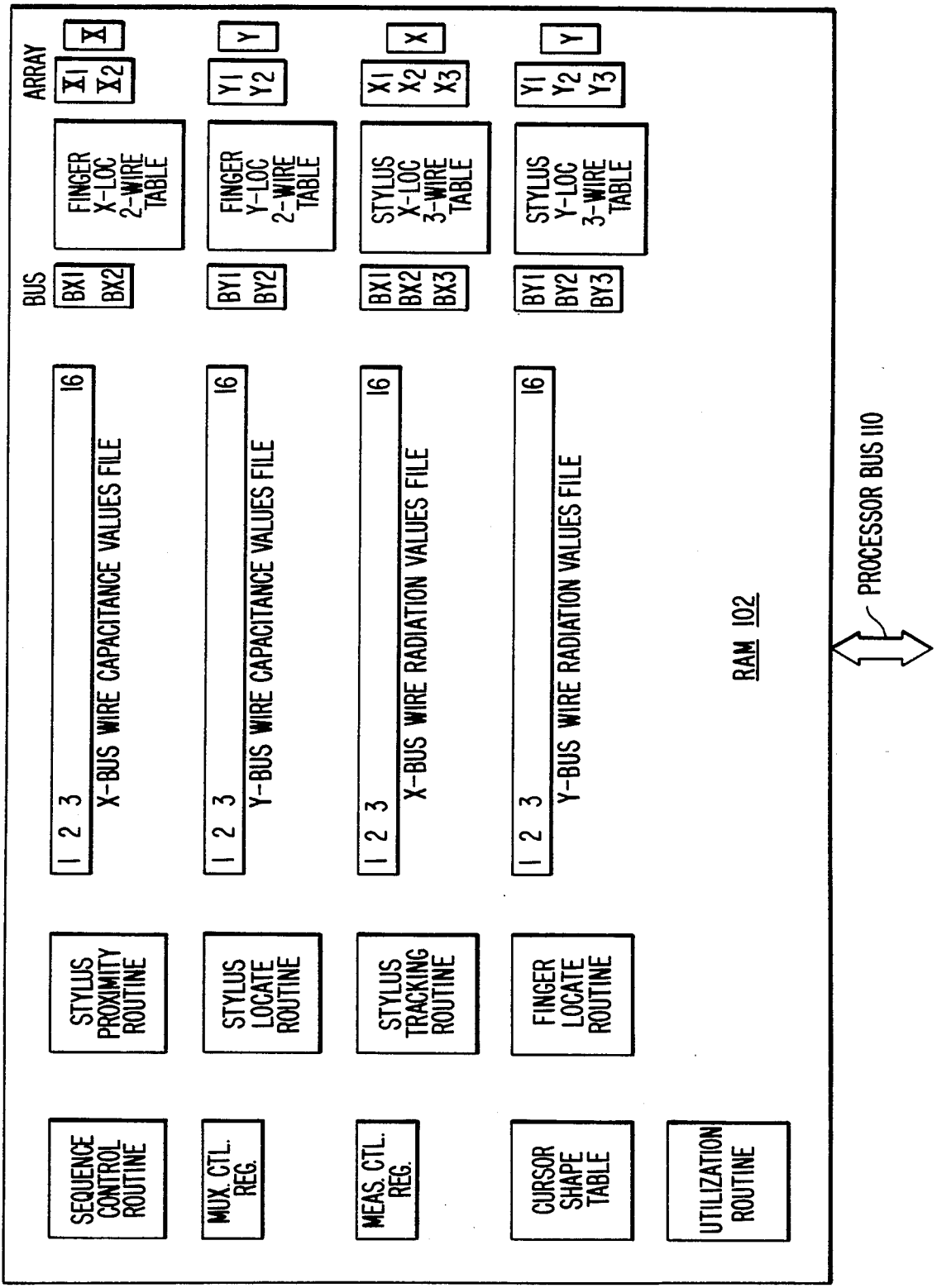

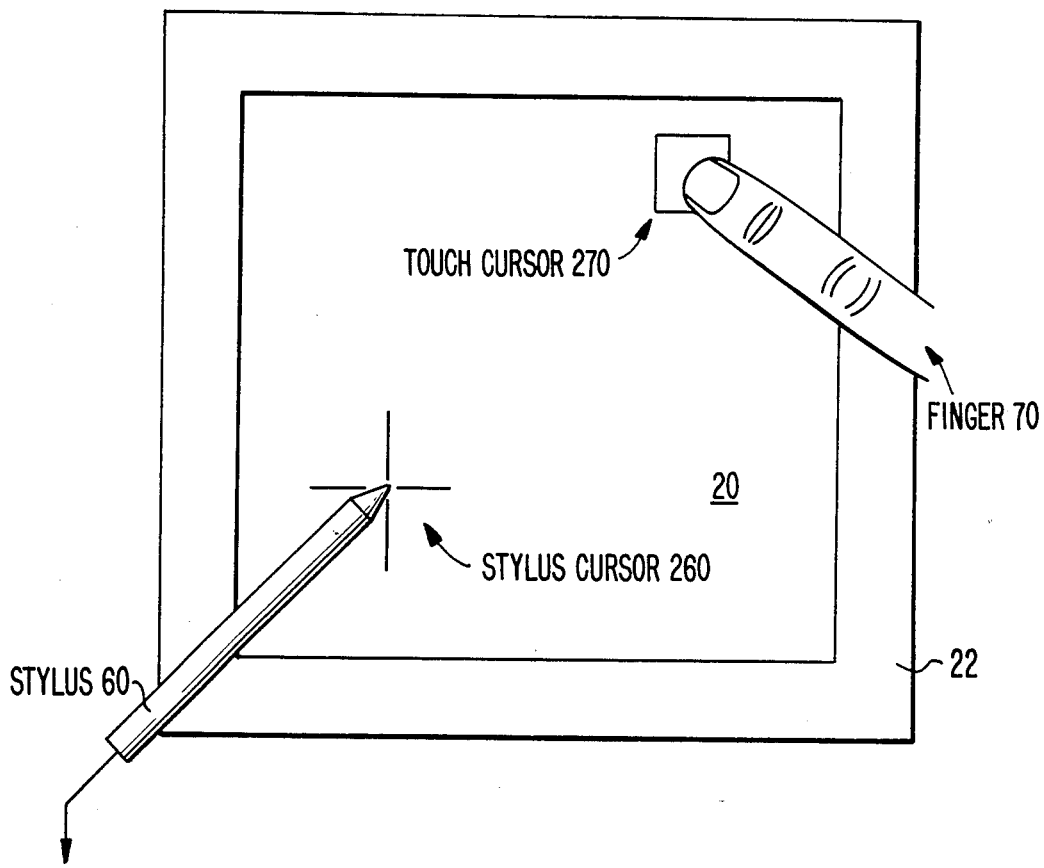

COMBINED FINGER TOUCH AND STYLUS DETECTION SYSTEM FOR USE ON THE VIEWING SURFACE OF A VISUAL DISPLAY DEVICE

BACKGROUND OF THE INVENTION

1. Technical Field

The invention disclosed broadly relates to data processing technology and more particularly relates to input devices for use in conjunction with visual displays.

2. Background Art

In data processing systems, a central processor executes a sequence of stored program instructions to process data provided by an input device and to present the results of the data processing operations to an output device. Data processing results can be presented in either alphanumeric text or in graphical form and a universal mechanism for manifesting those results is by means of a visual display device such as a cathode ray tube monitor, a gas panel display, an array of light emitting diodes, or other types of visual display devices. Frequently, the results presented to the user on a visual display device, will require the user to provide additional data to the data processing system. Various types of data input devices have been employed in data processing systems, for example keyboard input, graphical tablet input, and various forms of display surface inputs. Human factors studies have shown that by providing a means for inputting data on the visual display screen itself, the user can achieve the most closely coupled interactive operations with the data processing system. When the user responds to visual signals output at the face of the visual display device, by inputting signals at that same visual display surface, an accuracy and immediacy in the interaction between man and machine can be achieved. This form of input device is easy to learn to use and seems the most natural and user-friendly to the operator Various types of interactive input devices for use at the display surface have been provided in the prior art. One of the first forms of interactive devices was the light pen, which is an optical detector provided in a hand-held pen, which is placed against the display surface of a cathode ray tube screen. When the dot of light represented by the scanning raster is detected by the light pen, the coordinates of the raster dot are attributed as the location of the hand-held pen. Another type of interactive input device for use on a display surface is the mechanical deformation membrane, which is a transparent laminate placed over the display surface. The laminate consists of two conductor planes respectively deposited on a flexible medium so that when the user mechanically displaces one of the conductor planes by a finger touch, the conductors are brought into electrical contact with the conductors in the second plane. The electrical resistance of the conductor plane is changed as a function of the position of the finger touch on the membrane and appropriate electronics are provided to translate that resistance value into the position attributed to the finger touch.

Opaque graphics tablets, upon which a sheet of drawing paper can be supported for tracing with an electronic stylus, have been provided in the prior art. In opaque graphics tablets, a horizontal wire grid and a vertical wire grid are embedded in the surface of the tablet. The wires in the tablet are driven with a signal which is electromagnetically radiated from the surface of the tablet and which is received by a pickup stylus connected to a signal detector. In one type of opaque graphics tablet, a field gradient is imposed from one side to the other side of the tablet and the strength of the field as picked up by the stylus, is correlated with the position attributed to the stylus. Another approach has been described by H. Dym, et al. in U.S. Pat. Nos. 3,992,579; 3,999,012; and 4,009,338, those patents being assigned to the IBM Corporation. Dym, et al. describe driving the conductors embedded in the opaque graphics tablets so that they are selectively energized with 40 kilohertz signals in a multiple stage operation to first determine the stylus proximity to the surface of the tablet and then to track the position of the stylus along the surface of the tablet in the horizontal and vertical directions. During the proximity stage of operation, the conductors in all regions of the tablet surface emit signals which are detected by the stylus as it approaches the surface. When the amplitude of the received signals is great enough, the operation then changes into the locate and tracking mode which is programmed to produce periodic indications of the stylus position with respect to the horizontal and vertical conductors embedded in the tablet.

The popularity of the Personal Computer can be attributed, in part, to the enhanced productivity which can be achieved by applying data processing techniques to the execution of tasks which were previously done manually. Typical applications employing an interactive input at the display surface of the monitor in a Personal Computer, require the operator to make control selections at the keyboard, perhaps selecting the mode of operation or particular image to be displayed, prior to using the interactive input device for inputting data to the system. For example, in hotel management applications, the operator would enter control information at the keyboard to select either a first displayed image for a room assignment application or a second displayed image for entering billing information. Only after having made the control input at the keyboard, will the operator be able to make data entries by means of the interactive input at the display surface.

OBJECTS OF THE INVENTION

It is therefore an object of the invention to provide an improved interactive input device for a display surface.

It is another object of the invention to provide an interactive input device which permits either finger touch input or stylus detection input modes.

It is yet a further object of the invention to provide an improved interactive input for a display surface which can be adapted to a variety of surface contours.

It is yet a further object of the invention to provide an improved interactive input for a display surface which is reliable and is inexpensive to manufacture.

It is yet a further object of the invention to provide an interactive input device for use at a display surface, which permits the simultaneous detection of both a finger touch and a stylus position.

DISCLOSURE OF THE INVENTION

A combined finger touch and stylus detection system is disclosed for use on the viewing surface of a visual display device. The system includes an array of horizontal and vertical conductors arranged on the viewing surface of the visual display device, having an I/O terminal coupled thereto, for conducting electrical signals between the terminal and the vicinity of the viewing surface. A radiative pickup stylus is also included, having an output terminal, for receiving electromagnetic signals radiated from the array.

The system includes a selection means having a switchable path connected to the I/O terminal of the array and having a control input, for connecting selected patterns of a plurality of the horizontal and vertical conductors to the switchable path in response to control signals applied to the control input. A capacitance measuring means is also included, having an input coupled to the switchable path of the selection means, for measuring the capacitance of selected ones of the conductors in the array, in response to the control signals applied to the control input.

The system further includes a radiative signal source having an output coupled to the switchable path of the selection means, for driving selected ones of the conductors in the array, in response to the control signals applied to the control input. A radiative signal measuring means is also included, coupled to the radiative pickup stylus, for measuring the electromagnetic signals received by the stylus.

In addition, the system includes a control processor connected to the control input of the selection means, for executing a sequence of stored program instructions to sequentially output the control signals to the selection means. The control processor is connected to the capacitance measuring means, for receiving measured capacitance values of the conductors when the selection means, in response to the control signals, has connected a first pattern of a plurality of the conductors in the array to the capacitance measuring means, to detect the location of a finger touch with respect to the viewing surface of the display device. The control processor is also connected to the radiative signal measuring means, for receiving measured radiative signal values when the selection means, in response to the control signals, has connected a second pattern of a plurality of the conductors in the array to the radiative signal source, to detect the location of the stylus with respect to the viewing surface of the display device.

In this manner, both finger touch location and stylus location with respect to the viewing surface of the display, can be detected.

The system can be used for both sequential and simultaneous detection of finger touch and stylus position. The system makes use of a unique interconnection arrangement for the horizontal and vertical conductors to respective buses which are of a reduced size, thereby saving space and driver electronics. A unique overlay membrane structure supports the horizontal and vertical conductors of the array and has sufficient mechanical flexibility to enable it to conform to the surface contour of a variety of display surfaces.

BRIEF DESCRIPTION OF THE DRAWINGS

The foregoing and other advantages of the invention will be more fully, understood with reference to the description of the best mode and the drawing wherein:

FIG. 1 is a front view of the overlay 20 and the mounting frame 22.

FIG. 2 is a side cross-sectional, breakaway view of the overlay and mounting frame of FIG. 1, along with section line 2—2'.

FIG. 3 is a side view of the overlay 20 and the stylus 60 for stylus detection.

FIG. 4 is a schematic view of the overlay for stylus detection.

FIG. 5 illustrates the radiative signal amplitude for measuring pair P0 in stylus detection.

FIG. 9 is an architectural diagram of the detection system.

FIG. 10 is a flow diagram of the operation of the first embodiment of the invention for detecting either finger touch or stylus position.

FIG. 11 is a rear view of the general layout of the overlay 20.

FIG. 12 is a side cross-sectional view of the overlay 20 along the section line 12—12' of FIG. 11, showing the detail of the display input area.

FIGS. 16A, B, & C are a flow diagram of a second embodiment of the invention, when both finger touch and stylus detection can be simultaneously carried out.

FIG. 17 is a timing diagram for the second embodiment of the invention, for the simultaneous detection of both finger touch and stylus location.

FIG. 18 is a diagram of the memory organization for the RAM 102 in the second embodiment of the invention.

FIG. 19 is a front view of the display as seen through the overlay 20, showing the simultaneous finger touch and stylus detection, in accordance with the second embodiment of the invention.

DESCRIPTION OF THE BEST MODE FOR CARRYING OUT THE INVENTION

Figure 6:
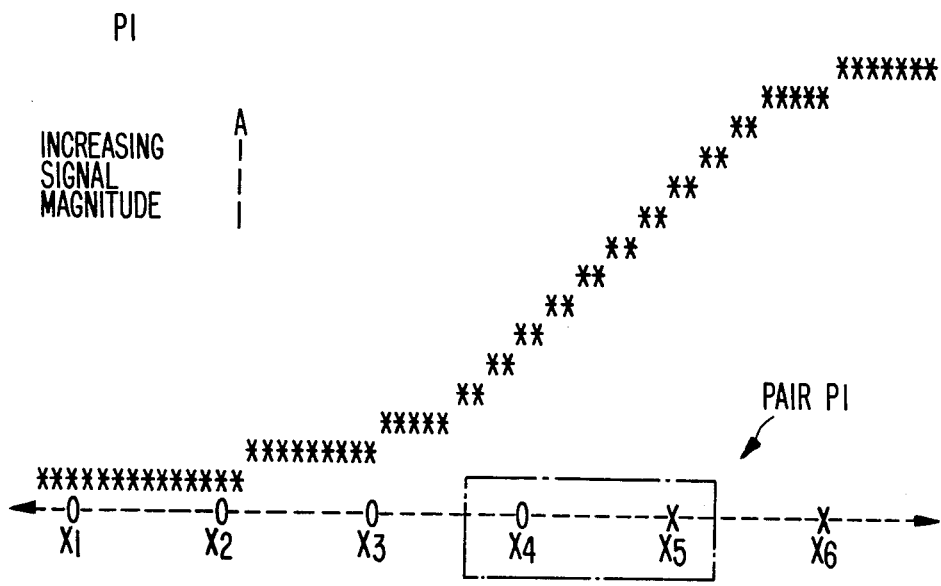
FIG. 6 shows the measurement for the pair P1 for stylus detection.

The combined finger touch and stylus detection system is shown in a front view in FIG. 1 and in a side cross-sectional view in FIG. 2, in association with a cathode ray tube display. The overlay 20 consists of two sheets of durable, transparent plastic, with an array of horizontal transparent conductors embedded in the first sheet and an array of vertical transparent conductors embedded in the second sheet. The overlay 20 can be mounted by means of the frame 22 onto the display surface 32 of the cathode ray tube 24. The mounting frame 22 consists of a base portion 28 which attaches to the sidewall 26 of the cathode ray tube (CRT) 24. The front facing surface 30 of the base portion 28 can have a curvature substantially the same as the curvature of the display surface 32. The overlay 20 is mechanically flexible and can be laid directly upon the surface 32 of the CRT so that its edges overlap the surface 30 of the base portion 28 for the mounting frame 22. The clamping member 34 can then be placed over the edges of the overlay 20 so that the mating surface 38, which has a curvature similar to that of the surface 30, clamps the edges of the overlay 20. The mounting bolts 36 secure the member 34 to the base portion 28.

FIG. 2 shows a cross-sectional view of the overlay 20 positioned on the display surface 32 of the CRT. The overlay is stretched slightly by the mounting frame, to provide a smooth, tight and well supported surface for finger touch and stylus detection. The overlay shown in FIG. 3 consists of the inner substrate 50 which is a sheet of polyethylene terephthalate which is transparent, electrically insulative, and has a thickness of approximately 0.002 inches. An array of horizontal transparent conductors is deposited on the surface of the inner substrate 50 and are designated as Y1, Y2, Y3, etc., with the Y3 wire being shown in FIG. 3. The transparent conductors can be composed of indium tin oxide, for example, which is a well-known transparent conductor material. The thickness of the transparent conductor can be approximately 1000 angstroms. The conductors are approximately 0.025 inches wide and are spaced approximately 0.125 inches on a center-to-center spacing. An insulation layer 52 covers the horizontal Y wires and can be composed of a transparent adhesive such as ultraviolet initiated vinyl acrylic polymer having a thickness of approximately 0.002 inches. The upper portion of the overlay 20 shown in FIG. 3 consists of the outer substrate 54 which is a sheet of polyethylene terephthalate which is optically transparent, electrically insulative and has a thickness of approximately 0.002 inches. Deposited on the surface of the outer substrate 54 is a vertical array of transparent conductors designated X1, X2, X3 ... X6 .... The conductors X1, etc. are also composed of indium tin oxide and have a thickness of approximately 1000 angstroms, a width of approximately 0.025 inches and a spacing of approximately 0.125 inches, center-to-center. The outer substrate 54 and the vertical conductors X are joined by the adhesive insulation layer 52 to the inner substrate 50 and the horizontal wires Y. The X and the Y transparent conductors can also be composed of gold and silver or other suitable materials. The thickness of the conductors is adjusted to provide resistance below 50 ohms per square and an optical transmission which is greater than 80 percent.

FIG. 3 depicts the arrangement for detection of the stylus 60 when it is closer than the locate threshold distance 62. The principle of operation in the stylus detection mode is that the X and/or Y conductors are driven by a 40 kilohertz oscillator driver so that the X and/or Y conductors act as a transmitter of electromagnetic radiation and the stylus 60 acts as a receiver of that radiation. To transmit a signal, the oscillator selectively drives either the X conductors or the Y conductors. The stylus 60 detects the signal and electronics connected to the stylus digitizes the magnitude of the signal. The magnitude of the signal detected by the stylus is a function of the height of the stylus above the overlay 20. By comparing this magnitude to known thresholds, the height of the stylus above the overlay can be determined. When the stylus signal has reached the contact threshold corresponding to the locate threshold distance 62, the operation of stylus detection can shift from proximity detection to a location and tracking mode. The object of tracking the stylus is to have the X conductors and the Y conductors in the overlay driven in such a manner that the radiation picked up by the stylus 60 can enable the attribution of an instantaneous position for the stylus.

Figure 7:
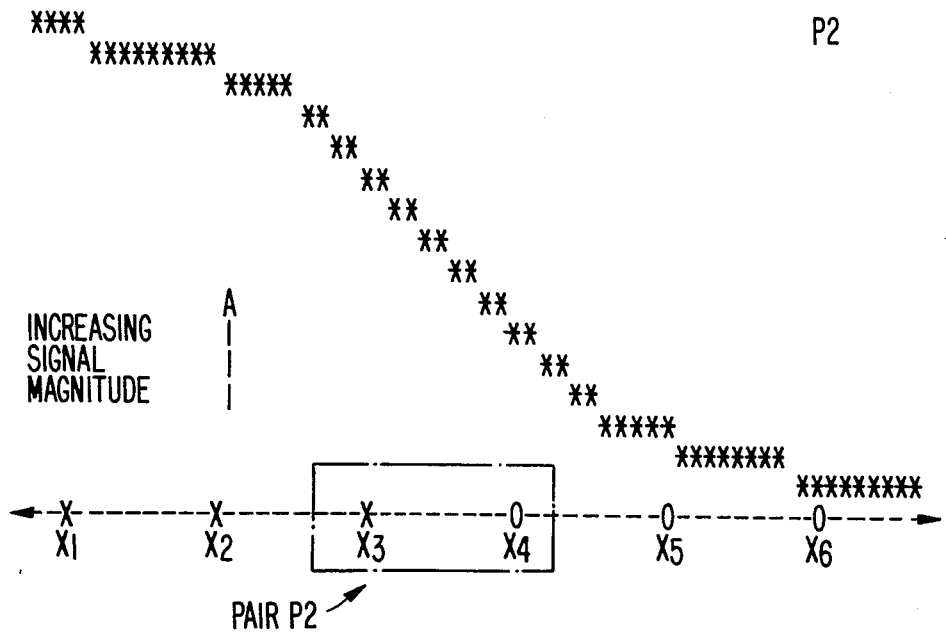
FIG. 7 shows the measurement for the pair P2 for stylus detection.

The basic drive pattern for determining the stylus position is schematically shown in FIG. 4. A wire pair is defined as two adjacent X conductors, for example, with the left-hand conductor and several conductors to the left thereof being either grounded or connected to a first reference potential and the right-hand conductor and several conductors to the right thereof being driven by the oscillator driver. FIG. 4 shows the wire pair P0 located beneath the stylus 60, with the conductor X3 being the left-handed conductor and the conductor X4 being the right-handed conductor. The conductors X1, X2 and X3 are connected to ground potential whereas the conductors X4, X5 and X6 are connected to the oscillator driver. FIG. 5 shows the amplitude of the signal received by the stylus 60 as it would pass from left to right from above the conductor X1 to a position above the conductor X6. Note that within and around the wire pair X3 and X4, the stylus signal varies linearly with position. This linearity is the basis for an accurate interpolation technique for providing a precise measure of the position of the stylus 60 based upon the measurement of radiation from three wire pairs. The first stage in the measurement is measuring the amplitude for the wire pair P0. FIG. 6 shows the second stage in the measurement where the wire pair P1 is formed with the conductors X4 and X5. The plot of the magnitude of the signal received by the stylus 60 which remains fixed at its location shown in FIGS. 4 and 5, would indicate a lower relative measured amplitude for the wire pair P1 measurement. The final data in the three stage operation of locating the position of the stylus 60 is shown in FIG. 7, where the wire pair P2 is the inverse of the wire pair P0. That is, the conductors X1, X2 and X3 are driven with the oscillator driver, whereas the conductors X4, X5 and X6 are connected to ground or reference potential. The signal amplitude is shown for the wire pair P2 in FIG. 7. Once again, with the stylus 60 remaining in the same position that it had for FIGS. 4, 5 and 6, the magnitude of this signal for the wire pair P2 will be measured.

The calculation of the horizontal position of the stylus 60 with respect to the vertical X conductors X1, X2, X3, etc. is done in two stages. First, the base coordinate is calculated and then second an offset coordinate is calculated which is added to the base coordinate to form the resultant measured position. To calculate the base coordinate, the system calculates the number of wires between the origin of coordinates at the left-hand edge of the overlay and the first wire adjacent to the axis of the stylus 60. This number of wires is multiplied times the pitch of the X conductor separation, in this case 0.125 inches, to obtain the base coordinate value. The base coordinate produced is the midpoint between the wire pair X3 and X4 in this example.

The offset coordinate is the coordinate of the stylus relative to the midpoint of the wire pair X3 and X4. The offset coordinate is equal to the wire separation pitch in the horizontal direction times (P0−P2) divided by 2×(P0−P1). The numerator of this expression is a linear expression within a wire pair whereas the denominator is a constant. Both of these terms depend upon the angle of the stylus with respect to the tablet which can vary during normal operation. The division operation cancels this dependence, allowing the expression to be invariant as to the angle at which the stylus is held. The resulting ratio varies linearly between approximately −1 and +1 and, when multiplied times the pitch, gives an additive factor which, when added to the base coordinate, results in the interpolated value for the horizontal position of the stylus with respect to the vertical X conductors. The resolution for this measurement is typically 0.01 inches. A similar operation is conducted for the horizontal conductors Y1, Y2, etc. to establish the vertical position of the stylus with respect to the horizontal conductors.

It is seen that in order to locate position of the stylus with respect to the vertical conductors, the vertical conductors must be arranged with each conductor in any group of at least six adjacent conductors, uniquely connected to the oscillator driver. A similar condition must also prevail for the horizontal Y conductors. As was previously mentioned, in order to obtain an approximately 0.01 inch resolution, a grid pitch of approximately 0.125 inches must be maintained for the conductors in both the horizontal direction and in the vertical direction. If a display area of 12-13 inches in the horizontal and the vertical direction is to be covered by the overlay, then approximately 100 vertical X conductors and 100 horizontal Y conductors will be required in the overlay 20. If 200 different drivers were required to drive all 200 conductors, the mechanical and electrical complexity necessary to make that connection would be prohibitive. It is clearly advantageous to provide some means for reducing the number of driver wires which interconnect the conductor wires in the array to the oscillator driver. Dym, et al. have provided in their above cited patents, a busing technique which employs a horizontal bus having 24 separate driver wires each of which are respectively connected to several vertical conductors in the opaque graphics tablet disclosed therein. The horizontal conductors are similarly arranged and are connected through a vertical bus also having 24 wires. Taking the vertical array conductors for example, the 24 wires in the horizontal bus feeding the vertical array conductors were classified into three sets of eight wires each. The vertical array conductors were divided into groups. To make the individual groups of array conductors unique for the purposes of detection by the stylus, the order of the array conductors is changed for every group. This reduced the number of drive wires in the bus since each wire in the bus was connected to and drove multiple array conductors. The separation between array conductors connected to the same bus wire has to be large enough so that signals sensed in one region of the array are not influenced by the other conductors in the array connected to the same bus wire.

Figure 8:
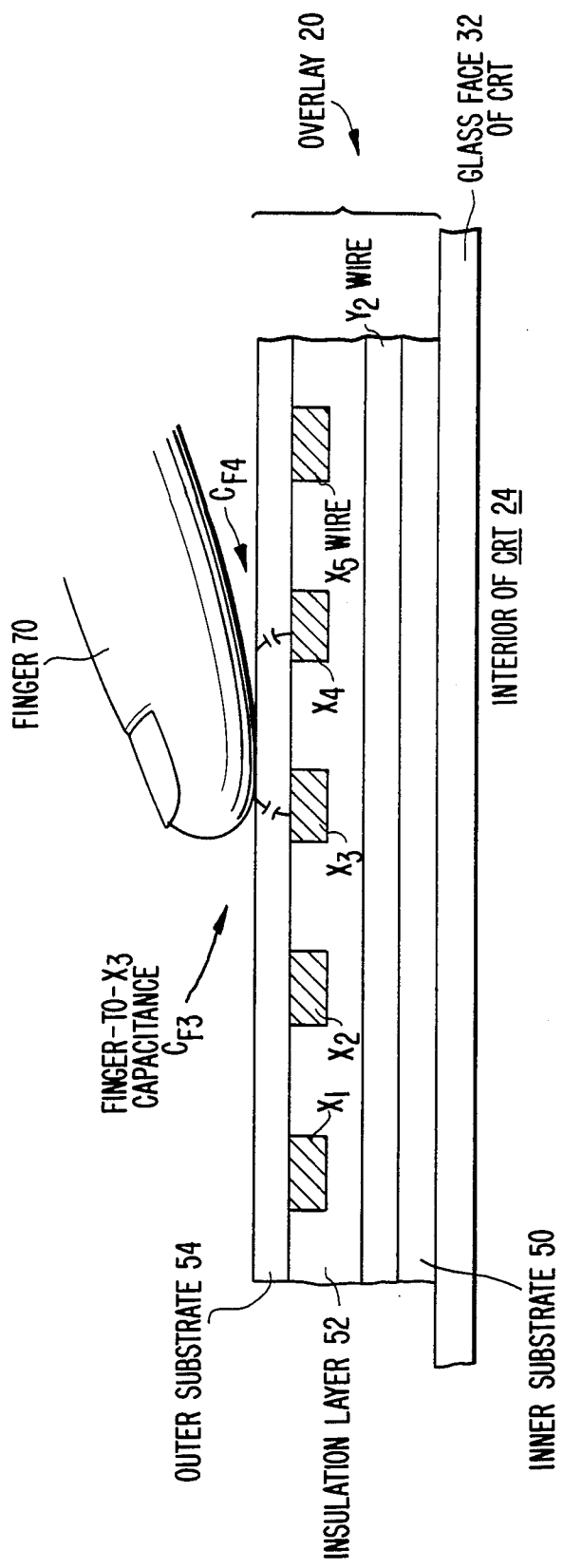
FIG. 8 is a cross-sectional view of the overlay 20 and the finger 70 for finger touch detection.

The problem with the arrangement of the array conductors as described by Dym, et al. for their opaque graphics tablet, is that it cannot be used for the capacitive detection of a finger touch such as is illustrated in FIG. 8. The finger 70, when touching the surface of the outer substrate 54 in FIG. 8, will, at best, approximately cover only two adjacent array conductors, in the case illustrated, X3 and X4. If the location of the finger 70 is to be measured with the resolution equivalent to the pitch of the conductors, in this case 0.125 inches, then the capacitance change for a first conductor and for an adjacent second conductor must be measured. In the case of FIG. 8, the capacitance CF3 between the finger 70 and the X3 conductor must be measured and the capacitance CF4 between the finger 70 and the conductor X4 must be measured. The capacitance of all the X conductors X1-X5 and all of the Y conductors can be measured, but the finger location is determined by identifying the two adjacent vertical X conductors and the two adjacent horizontal Y conductors having the maximum change in their capacitance. The array conductors must be connected to their bus drive wires in such a manner that each adjacent pair of array conductors constitutes a unique combination which is never duplicated elsewhere on the array. One of the problems solved by the invention disclosed herein is how to combine both finger touch detection and stylus location detection using the same array of horizontal and vertical conductors connected through their respective drive buses.

Figure 14:
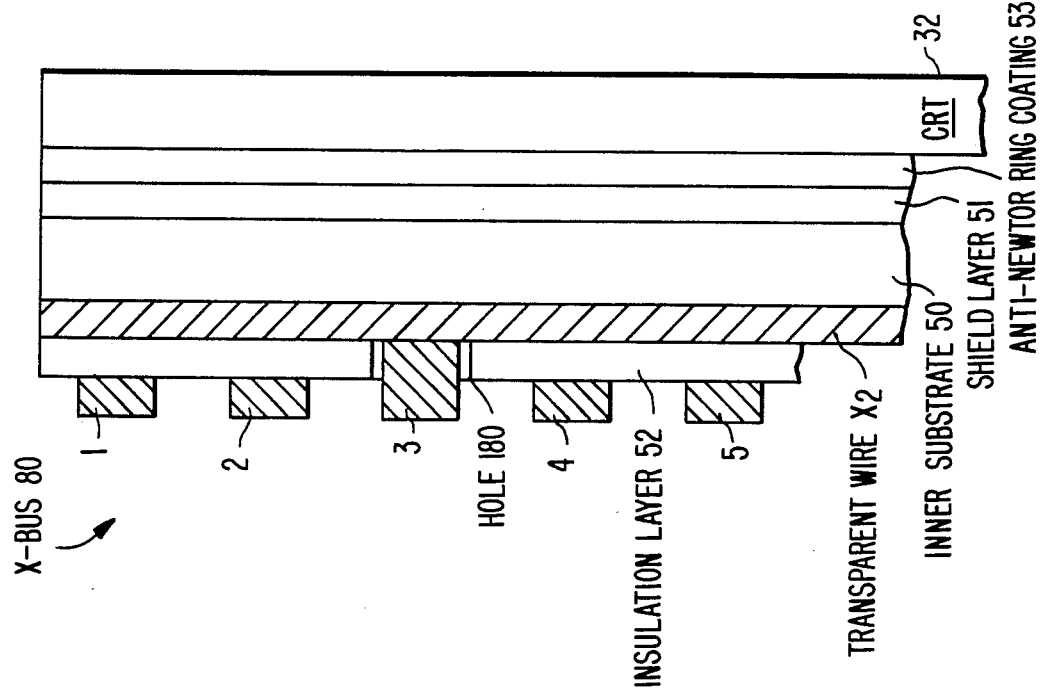
FIG. 14 is a side cross-sectional view along the section line 14—14' of FIG. 13.
Figure 13:
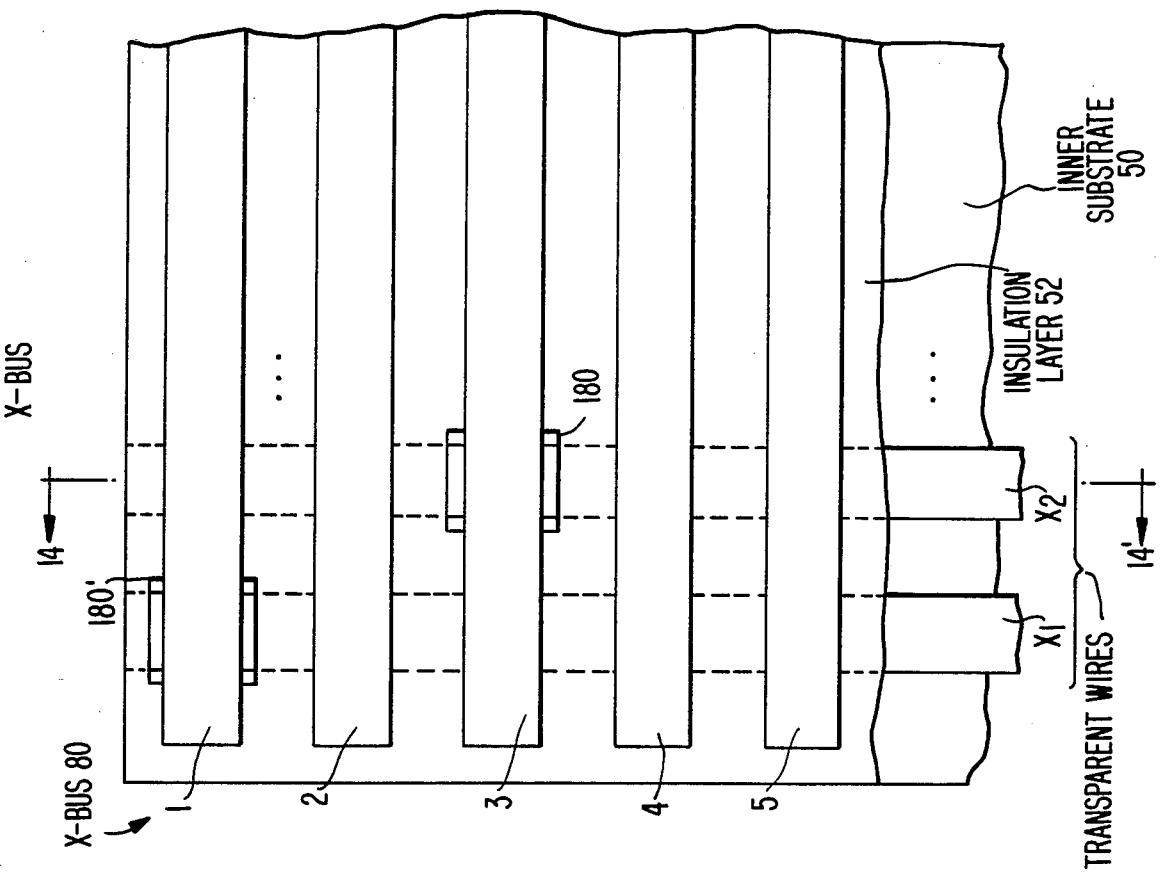
FIG. 13 is a front breakaway view of the overlay 20 in the bus region.

FIG. 11 is a rear view over the overlay 20 showing the general layout of the overlay. The X bus 80 consists of 16 drive wires 1, 2, . . . 16 and similarly the Y bus 90 consists of 16 bus wires. The X bus 80 is connected through the X connector 182 to the drive electronics. Similarly, the Y bus connector 184 connects the Y bus 90 to the drive electronics. The display input area 188 has the transparent array conductors arranged therein with the vertical transparent conductors X1-X112 selectively connected to the bus wires 1-16 in the X bus 80. Correspondingly, the horizontal transparent conductors Y1-Y112 are selectively connected to the 16 bus wires of the Y bus 90. FIG. 13 is a front detailed view of the X bus 80, showing the bus wires 1, 2, 3, 4 and 5 of the X bus 80. Two vertical transparent array wires X1 and X2 are shown respectively connected to the X bus wires 1 and 3, for example. FIG. 14 is a cross-sectional view of FIG. 13, showing how the horizontal bus wire 3 connects through an aperture 180 in the insulation layer 52 to make connection to the transparent wire X2. The actual pattern for interconnecting the 16 bus wires 1-16 the X bus 80 to the 112 vertical, transparent array conductors X1-X112, is shown for the X bus layout in FIG. 15. The order of connection is also given in Table I.

In the preferred embodiment, the number of vertical array conductors X1, X2, . . . , which must be capable of independent control, is a function of the pitch of the wires in the array (the number per unit distance in the horizontal direction), the number of position determinations per unit time (the sampling rate of the wires in the array), and the maximum speed of the stylus movement which is desired to be accommodated. Using the wire pair concept shown in FIGS. 4-7, let the number of wires to the left of the wire pair (including the left-hand member of the pair) be the quantity M and let there also the same number M of wires to the right of the wire pair (including the right-hand member of the pair). The total quantity of 2M adjacent wires represents a group, which must span a horizontal distance great enough to exceed the maximum allowable distance which will be displaced by the stylus during one interval between successive position determinations (the sampling interval). In each group of adjacent 2M wires, each wire must be uniquely connected to one of the plurality of bus wires in the horizontal bus 80. The same is equally true for the horizontal array conductors Y1, Y2, . . . .

For example, if the maximum speed of the stylus is 48 inches per second, the sampling rate is 100 position determinations per second, the pitch of the wires is 0.125 inches, then the quantity of M will be four wires on each side of the wire pair. In this example, the array must be organized so that each group of eight adjacent wires has each wire therein uniquely connected to the bus wires in its corresponding bus, in order to accurately track the position of the stylus moving at up to 48 inches per second. A wiring pattern which will accommodate this example is shown in Table I and in FIG. 15.

TABLE I

Sequence With Four-Wires-On Tracking

| | | | | | | | | | | | | | | | | |
|---|---|---|---|---|---|---|---|---|---|---|---|---|---|---|---|---|
| Drive No. | 16 | 1 | 14 | 2 | 13 | 3 | 12 | 4 | 11 | 5 | 10 | 6 | 9 | 7 | 8 | 15 |
| Occurrence | 1 | 1 | 1 | 1 | 1 | 1 | 1 | 1 | 1 | 1 | 1 | 1 | 1 | 1 | 1 | 1 |
| N to Self | — | — | — | — | — | — | — | — | — | — | — | — | — | — | — | — |
| N to Four | — | — | — | — | — | — | — | — | — | — | — | — | — | — | — | — |
| Drive No. | 2 | 1 | 3 | 14 | 4 | 13 | 5 | 12 | 6 | 11 | 7 | 10 | 8 | 9 | 15 | 3 |
| Occurrence | 2 | 2 | 2 | 2 | 2 | 2 | 2 | 2 | 2 | 2 | 2 | 2 | 2 | 2 | 2 | 3 |
| N to Self | 12 | 15 | 12 | 16 | 12 | 16 | 12 | 16 | 12 | 16 | 12 | 16 | 13 | 16 | 14 | 12 |
| N to Four | 10 | 9 | 10 | 9 | 10 | 9 | 10 | 9 | 10 | 10 | 11 | 11 | 9 | 10 | 10 | 10 |
| Drive No. | 16 | 2 | 4 | 1 | 5 | 14 | 6 | 13 | 7 | 12 | 8 | 11 | 9 | 16 | 10 | 15 |
| Occurrence | 2 | 3 | 3 | 3 | 3 | 3 | 3 | 3 | 3 | 3 | 3 | 3 | 3 | 3 | 3 | 3 |
| N to Self | 31 | 16 | 13 | 17 | 13 | 17 | 13 | 17 | 13 | 17 | 13 | 17 | 16 | 12 | 18 | 16 |
| N to Four | 11 | 10 | 11 | 10 | 11 | 10 | 11 | 10 | 11 | 12 | 9 | 10 | 11 | 10 | 11 | 9 |
| Drive No. | 4 | 3 | 5 | 2 | 6 | 1 | 7 | 14 | 8 | 13 | 9 | 12 | 10 | 11 | 15 | 5 |
| Occurrence | 4 | 4 | 4 | 4 | 4 | 4 | 4 | 4 | 4 | 4 | 4 | 4 | 4 | 4 | 4 | 5 |
| N to Self | 13 | 17 | 12 | 17 | 13 | 17 | 13 | 17 | 13 | 17 | 13 | 17 | 13 | 17 | 14 | 12 |
| N to Four | 10 | 10 | 11 | 10 | 11 | 10 | 11 | 10 | 11 | 10 | 11 | 11 | 9 | 10 | 11 | 10 |
| Drive No. | 16 | 4 | 6 | 3 | 7 | 2 | 8 | 1 | 9 | 14 | 10 | 13 | 11 | 16 | 12 | 15 |
| Occurrence | 4 | 5 | 5 | 5 | 5 | 5 | 5 | 5 | 5 | 5 | 5 | 5 | 5 | 5 | 5 | 5 |
| N to Self | 31 | 14 | 13 | 17 | 13 | 17 | 13 | 17 | 13 | 17 | 13 | 17 | 14 | 12 | 18 | 16 |
| N to Four | 11 | 10 | 11 | 10 | 11 | 10 | 11 | 10 | 11 | 11 | 9 | 10 | 11 | 10 | 11 | 10 |
| Drive No. | 6 | 5 | 7 | 4 | 8 | 3 | 9 | 2 | 10 | 1 | 11 | 14 | 12 | 13 | 15 | 7 |
| Occurrence | 6 | 6 | 6 | 6 | 6 | 6 | 6 | 6 | 6 | 6 | 6 | 6 | 6 | 6 | 6 | 7 |
| N to Self | 13 | 17 | 13 | 17 | 13 | 17 | 13 | 17 | 13 | 17 | 13 | 17 | 13 | 17 | 13 | 12 |
| N to Four | 11 | 10 | 11 | 10 | 11 | 10 | 11 | 10 | 11 | 10 | 11 | 10 | 9 | 10 | 11 | 10 |
| Drive No. | 16 | 6 | 8 | 5 | 9 | 4 | 10 | 3 | 11 | 2 | 12 | 1 | 13 | 16 | 14 | 15 |
| Occurrence | 6 | 7 | 7 | 7 | 7 | 7 | 7 | 7 | 7 | 7 | 7 | 7 | 7 | 7 | 7 | 7 |
| N to Self | 31 | 16 | 13 | 17 | 13 | 17 | 13 | 17 | 13 | 17 | 13 | 17 | 14 | 12 | 18 | 16 |
| N to Four | 11 | 10 | 11 | 10 | 11 | 10 | 11 | 10 | 11 | 11 | 9 | 10 | 11 | 12 | 15 | 16 |

To reduce the number of elements in the X bus 80, each bus wire 1-16 drives multiple X array conductors X1-X112. The separation between those X array conductors which are attached to the same bus wire, must be large enough so that signals sensed in one region of the overlay 20 are not affected by the other conductors connected to that same bus wire. The bus attachment pattern must isolate conductors attached to the same bus wire, by a sufficient distance to avoid confusion errors in the stylus locate mode and the stylus tracking mode. In the locate mode, the distance between any three adjacent vertical array conductors and the next occurrence of any of those conductors that is attached to the same bus wire, must be greater than the maximum height 62 at which a locate operation can begin, as is shown in FIG. 3. For the tracking mode, the distance between any group of adjacent wires that are driven simultaneously during the tracking operation, as shown in FIGS. 4-7, with respect to the next occurrence of another conductor connected to the same bus wire, must be greater than the expected displacement of the stylus which may occur during one complete tracking position determination cycle. This is typically approximately 0.75 inches. Added to this is the constraint necessary to accomplish capacitance finger touch sensing. Fingers are sensed by the change in capacitance when the fingers cover the transparent array conductors. Low force touches only change the capacitance of two adjacent conductors. The bus wire attachment sequence must be patterned so that the finger sensing portion of the system can identify capacitance changes in two adjacent conductors as a touch, which is unique and will not occur for any other combination of adjacent conductor pairs in the array. The essential finger sensing constraint is that only one pair of adjacent conductors in the array should be connected to the same pair of bus wires. In a 16 wire bus such as the X bus 80, there are 120 unique combinations of adjacent pairs of wires which will satisfy this condition. If there were a quantity of N bus wires in the bus, then there would be N(N−1) divided by 2 unique combinations of adjacent pairs of conductors which will satisfy this condition.

The bus wire attachment pattern requirement is to select a sequence that meets these adjacent conductor constraints and which maintains an adequate grid distance between groups of wires which are attached to the same bus wire. The allowable bus wire attachment sequences will differ for different numbers of bus wire elements N and for different numbers of array conductors X for vertical conductors. The greater the number of bus wires, the easier it is to meet the physical constraints on tracking speed and the threshold distance for stylus detection, for a given size overlay. All of the above considerations apply equally to the horizontal Y array conductors as they do for the vertical X array conductors.

Figure 15B:
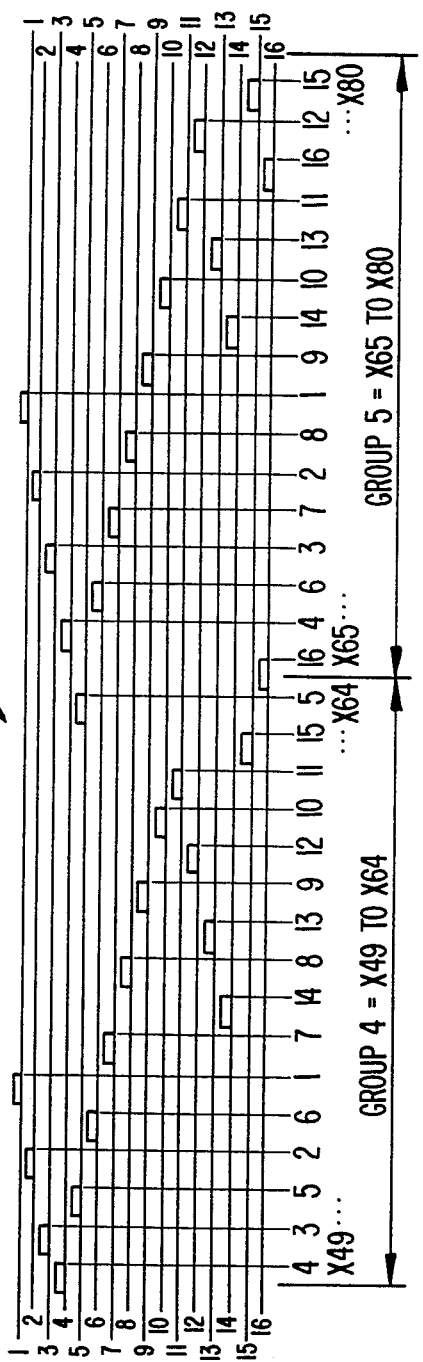
FIGS. 15A; 15B; 15C are a front view of the layout of the X bus for the overlay 20.
Figure 15C:
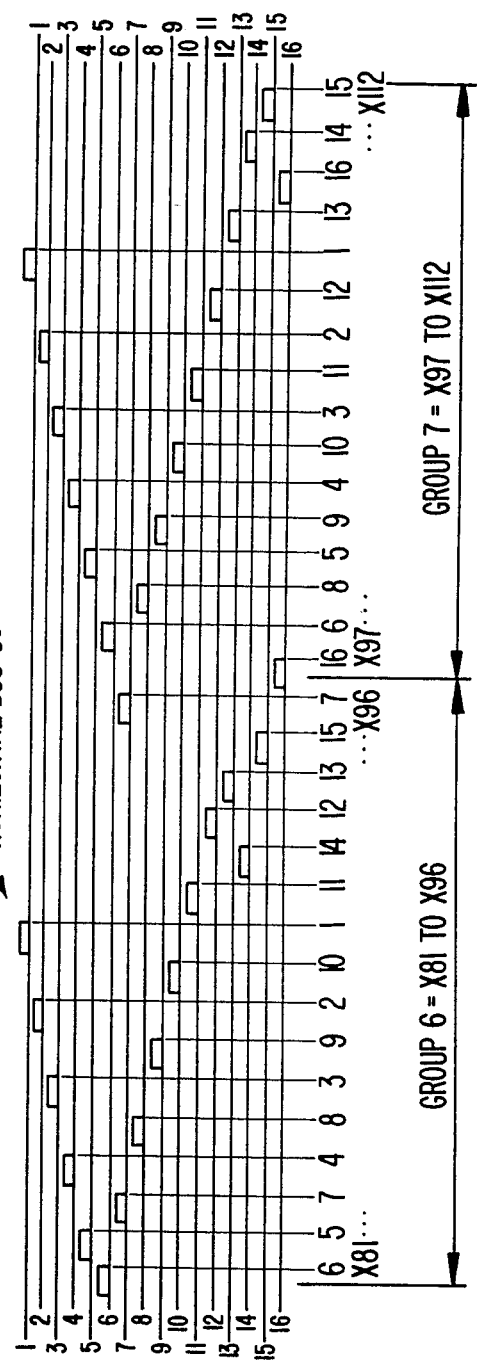

Table I and FIG. 15 represent an optimum bus connection sequence for the condition that the bus contains 16 bus wires which are connected to 112 transparent array conductors. The pattern was created by interleaving ascending and descending sequences of bus wires for most of the array conductors and then making special adjustments at the end to fill out the set of 112 array conductors in either the horizontal or the vertical direction.

FIG. 11 shows the general layout of the overlay 20 and shows the relative position of the four bolt holes 186 through which the bolts 36 of FIG. 2 pass, enabling the mounting of the overlay 20 onto the face of the CRT 24. The display input area 188 is shown in cross-sectional view in FIG. 12. The overlay is comprised of two major portions, the inner laminate 56 and the outer laminate 58 which are attached as shown in FIG. 12 by the adhesive layer 52'. The inner laminate 56 is stretched upon the outer surface of the glass face 32 of the CRT 24. The inner laminate 56 has an anti-newton ring coating 53 which is applied to the display side of the overlay to eliminate newton rings when the inner laminate comes into contact with the glass face 32. An electrostatic shield layer 51 consists of a full panel coating of indium tin oxide which is grounded. This coating shields the vertical X conductors and horizontal Y conductors from electrostatic noise generated by the cathode ray tube 24. The electrostatic shield layer 51 must be less than 100 ohms per square and must exceed an optical transmissivity of 80 percent. The inner substrate layer 50 is an optically clear layer of polyethylene terephthalate onto which is magnetron sputtered the transparent wire coating of indium tin oxide which will result in the vertical transparent conductors X1, X2, etc. The indium tin oxide coating is etched to provide 0.025 inch wide lines on 0.125 inch center line spacing. The resistance of the indium tin oxide layer must not exceed 80 ohms per square. There are 112 transparent, vertical conductors X1, X2, . . . X112. The outer substrate layer 54 of the outer laminate 58 is substantially the same as the inner substrate 50 and the indium tin oxide transparent conductor layer deposited on the outer substrate 54 has the same properties as the indium tin oxide transparent wire layer deposited on the inner substrate 50. The horizontal Y conductors Y1, Y2, . . . Y112 on the outer substrate 54 are oriented at right angles with respect to the vertical X conductors deposited on the inner substrate 50. During manufacture, the inner laminate 56 is built up as a composite and is coated with the insulation layer 52 which is a thin layer of ultraviolet initiated vinyl acrylic polymer. Similarly, during manufacture, the outer laminate 58 is coated with the insulation layer 52" which is identical in composition with the insulation layer 52. After the inner laminate 56 and the outer laminate 58 have been respectively constructed as separate composites, they are joined with the adhesive layer 52' which has the same composition as the insulation layer 52. The resulting overlay composite 20 has an overall thickness in the display input area 188 of approximately 0.005 inches, has a high optical transparency, and has a durable mechanical quality. The overlay 20 can be stretched and bent within limits to conform to the curvature of the cathode ray tube display surface, without rupturing the electrical continuity of the transparent conductors in the array. In an alternate embodiment, the X and Y array conductors could be deposited on the outer laminate 54 and the inner laminate 56, respectively.

FIG. 13 shows a front view of the X bus 80 for the overlay 20 and FIG. 14 shows a side cross-sectional view, illustrating how the bus wire 3 is electrically connected to the transparent array conductor X2. When the insulation layer 52 is applied to the surface of the inner laminate 56, it is deposited in a printing operation such as silk screening so that the array of apertures 180 and 180' as shown in FIGS. 13 and 15 are left open exposing selected transparent conductors. Thereafter, silver ink bus wires 1-16 are deposited on the outer surface of the insulation layer 52 so that they pass over selected ones of the apertures 180 and 180', thereby making electrical contact with the selected, exposed array conductors. For example, as is shown in FIG. 13 and FIG. 14, the bus wire 3 passes through the aperture 180 in the insulation layer 52 and makes electrical contact with the vertical transparent conductor X2. The resistance of the silver ink bus wires 1-16 does not exceed 20 ohms per inch for a 0.015 width line. The thickness of the bus wires does not exceed 0.001 inches.

FIG. 9 shows an architectural diagram of the detection system. The vertical conductors X1-X112 are connected through the X bus 80 to the wire select multiplexer 112 and the horizontal Y conductors Y1-Y112 are connected through the Y bus 90 to the wire selection multiplexer 112. The radiative pickup stylus 60 is connected through the gate 120 to the radiative pickup measurement device 122. The wire selection multiplexer 112 is connected through the mode multiplexer 116 to the capacitance measurement device 128 which is used for capacitance finger touch detection. The wire selection multiplexer 112 is also connected through the mode multiplexer 116 to the 40 kilohertz oscillator driver 126 which is used to drive the X bus 80 and the Y bus 90 for the stylus detection operation. The mode multiplexer 116 also has an enabling output to the gate 120 to selectively connect the output of the stylus 60 to the radiative pickup measurement device 122, for stylus detection operations. The output of the capacitance measurement device is connected through the analog-to-digital converter 130 to the processor address/data bus 110. The output of the radiative pickup measurement device 122 is connected through the analog-to-digital converter 124 to the bus 110. A control input 114 to the wire selection multiplexer 112 is connected to the bus 110 and the control input 118 to the mode multiplexer 116 is connected to the bus 110. The processor address/data bus 110 interconnects the control processor 100 with the read only memory (ROM) 104, the random access memory (RAM) 102, and the I/O controller 106. The I/O controller 106 has an I/O bus 108 which connects to a host processing system such as the I/O bus of an IBM Personal Computer.

The wire selection multiplexer 112 and the mode multiplexer 116 connects selected patterns of a plurality of the horizontal and vertical conductors in the overlay 20 to either the capacitance measurement device 128 or the 40 kilohertz oscillator driver 126, in response to control signals applied over the control inputs 114 and 118 from the bus 110 by the control processor 100. During finger touch operations, the capacitance measuring device 128 has its input coupled through the mode multiplexer 116 and the wire selection multiplexer 112 to selected ones of the horizontal and vertical conductors in the overlay 20 in response to control signals from the control processor 100. The output of the capacitance measurement device 128 is converted to digital values by the converter 130 and is applied over the bus 110 to the control processor 100, which executes a sequence of stored program instructions to detect the horizontal array conductor pair and the vertical array conductor pair in the overlay 20 which are being touched by the operator's finger. In the stylus detection mode, the 40 kilohertz output of the oscillator driver 126 is connected through the mode multiplexer 116 and the wire selection multiplexer 112 to selected ones of the conductors in the overlay 20, in response to control signals applied over the control inputs 114 and 118 from the control processor 100. The electromagnetic signals received from the overlay 20 by the stylus 60 are passed through the gate 120 to the radiative pickup measurement device 122, which measures those signals and provides an output which is digitized by the converter 124 and output to the control processor 100. The control processor 100 executes a sequence of stored program instructions to detect the proximity of the stylus to the overlay 20 in the proximity detection mode and then to locate and track the horizontal and vertical position of the stylus with respect to the overlay 20 in the location and tracking mode. The stored program instructions for carrying out these operations can be stored in the read only memory 104 and/or the RAM 102, for execution by the control processor 100. Positional values and other result information can be output through the I/O controller 106 on the I/O bus 108 to the host processor for further analysis and use in applications software.

FIG. 10 is a flow diagram of a first embodiment of the invention where either finger touch operations or alternately stylus detection operations can be carried out, one to the exclusion of the other during a particular sensing interval. During the proximity search mode, the capacitance finger touch operations are interleaved with the radiative stylus pickup operations to determine whether either a finger touch has been initiated or a stylus has been brought into threshold proximity to the overlay 20. When either of these conditions are found, the stored program instructions represented by the flow diagram of FIG. 10, will lock out the opposite search sequence and will proceed to the locate sequence for the finger touch or for the stylus detection, whichever has been sensed.

This alternate scanning for either the initiation of a finger touch or the beginning of stylus detection is carried out by steps 140-148 and 154-160 of the flow diagram of FIG. 10. In step 140, the X-drive sequence is updated followed by step 142 where the touch sensing function of the capacitance measurement device 128 is turned on by appropriate control signals to the mode multiplexer 116 and the wire selection multiplexer 112. Then in step 144 the X axis conductors in the overlay 20 are sensed by the capacitance measurement device 128. In step 146 the signal strength for capacitive coupling by a finger touch is determined by the control processor 100. Control processor 100 then determines whether the touch threshold has been crossed in step 148. If the touch threshold has been crossed, the program transfers to step 150 to the touch locate mode. If the touch threshold has not been crossed, the program transfers to step 154 to determine whether the stylus has come into close proximity to the overlay 20. In step 154, the mode multiplexer 116 disconnects the capacitance measurement device 128 and connects the 40 kilohertz oscillator driver 126 to the overlay 20 through the wire selection multiplexer 112. The mode multiplexer 116 also enables the gate 120 so that the received signals by the stylus 60 can be passed to the radiative pickup measurement device 122. In step 156, proximity sensing operations are carried out by the oscillator driver 126 driving a plurality of either the X conductors or the Y conductors or both X and Y conductors in the overlay 20 and by the radiative pickup measurement device 122 determining whether the stylus 60 has received a sufficiently large magnitude signal to indicate close proximity of the stylus to the overlay. In step 158, the signal strength measured by the radiative pickup measurement device 122 is analyzed by the control processor 100 and in step 160 the control processor 100 determines whether the stylus threshold has been crossed. If the stylus threshold has not been crossed, then the program returns to step 140 to check again as to whether a finger touch has been initiated. If the stylus threshold has been crossed in step 160, then the program passes to step 162 for the stylus locate and tracking mode to begin.

When the touch threshold has been crossed, as determined by step 148, the program passes to step 150 where the touch locate mode begins. The capacitance measurement device 128 is connected through the mode multiplexer 116 and the wire select multiplexer 112 and the capacitance of each respective vertical bus wire 1-16 in Y-bus 90 and each respective horizontal bus wire 1-16 in X-bus 80 is measured and their values digitized by the converter 130 and output over the bus 110 to the control processor 100. The control processor 100 identifies the unique pair of the 112 vertical X conductors XI and XI+1 having the highest capacitance and that is attributed as the horizontal position of the finger touch. Correspondingly, the unique pair of the 112 horizontal Y conductors YJ and YJ+1 having the highest capacitance values are identified and those are attributed as the vertical location for the finger touch. This information is output by the control processor 100 through the I/O controller 106 to the I/O bus 108.

If the stylus detection threshold is crossed in step 160, then the stylus locate and tracking mode in step 162 commences. The vertical X conductors X1-X112 are energized in groups of at least six conductors in a manner previously described for FIGS. 4-7, and the magnitude of the electromagnetic signals radiated therefrom are picked up by the stylus 60, measured by the radiative pickup measurement device 122 and the digital values output from the converter 124 are passed to the control processor 100. A similar operation takes place for the horizontal Y conductors Y1-Y112 in the overlay 20. The control processor 100 then processes these signals to locate the horizontal and vertical position of the stylus with respect to the overlay 20 and this resultant information is output through the I/O controller 106 to the I/O bus 108. The operation of tracking the consecutive positions of the stylus 60 with respect to the overlay 20 then takes place by sequentially updating the position of the stylus 60. If the magnitude of the signals received by the stylus 60 diminishes as determined in step 166, the program then passes back to step 140 where the finger touch initiation and stylus proximity detection operations are alternately carried out.

A second embodiment of the invention is shown in FIGS. 16-19 where, instead of locking out either the finger touch operation or the stylus detection operation when the other is being conducted, in the second embodiment both finger touch and stylus detection operations can be carried out simultaneously. This is achieved by multiplexing stylus detection and finger touch sensing in the proximity loop 200, multiplexing stylus location and finger touch sensing in the locate cycle 220, and multiplexing track stylus location detection and finger touch sensing in the tracking loop 240, as shown in the flow diagram of FIG. 16.

FIG. 16 shows the proximity loop 200 including steps 202-210 and FIG. 17 shows the timing diagram which includes the stylus proximity loop 200. As was previously mentioned, stylus proximity is determined by radiating a uniform 40 kilohertz signal from the overlay 20 and determining whether the stylus 60 is picking up a sufficiently large amplitude representation of that signal to pass a threshold value. This is represented by step 202 of the proximity loop 200. In step 204, the control processor 100 determines if the threshold has been passed and if so, the control processor 100 sets a flag S1. Whether the stylus proximity threshold has been exceeded or not, the program then passes to step 206 where the finger touch sensing operation takes place, during which the capacitance measurement device 128 is sequentially connected to each of the 16 bus wires in the X bus 80 and each of the 16 bus wires in the Y bus 90. The control processor 100 determines in step 208 whether the capacitance for any of the vertical array conductors X1-X112 or any of the horizontal Y conductors Y1-Y112 is greater than a threshold value and if it is, then the adjacent pair of vertical array conductors and the adjacent pair of horizontal array conductors which have the highest measured capacitance, are identified by the control processor 100 and attributed as the location of a finger touch which is output by the I/O controller 106, as previously described. The program then passes to step 210 to test whether the flag S1 is on or off indicating whether the proximity threshold for stylus detection was passed in step 202. If S1 is still off, then the program returns to step 202 to once again test for the proximity of the stylus. This operation for the stylus proximity loop 200 is shown in the timing diagram of FIG. 17. The control processor 100 can access a table stored in the RAM 102 and perform a table lookup to determine the correlation between the 16 bus wires in the X bus 80 and the corresponding vertical conductor adjacent pairs and also the 16 bus wires in the Y bus 90 and the corresponding horizontal adjacent conductor pairs, thereby speeding up the operation of finger touch location.

If step 202 detected that the stylus had come within the threshold proximity distance to the overlay 20, then the flag S1 would have been turned on and step 210 would have passed program control to the locate cycle 220. This would involve the passage of the program to step 222 where the stylus location procedure, as described above, would be carried out for the vertical array conductors X1-X112 and then the program would pass to step 224 to perform a similar stylus location operation for the horizontal array conductors Y1-Y112. Here again, tables can be stored in the RAM 102 which correlate detected amplitude maximum by the stylus 60 with the position attributable to the stylus in the horizontal and vertical directions. In step 222, the control processor 100 will output the X location attributed to the stylus 60 and in step 224 the control processor 100 will output the Y location attributed to the stylus 60, in the same manner as was described above. The locate cycle 220 then passes control to step 226 where, once again, the finger touch sensing operation takes place in a manner similar to that described for step 206. If an increased capacitance for the array conductors is detected in step 226, then the control processor 100 in step 228, will output the coordinates for the finger touch to the I/O controller 106 to the I/O bus 108, as previously described for step 208. Note that both the stylus location and the finger touch location can be separately and substantially simultaneously output by the control processor 100 over the I/O bus 108 during the locate cycle 220. This can be seen for the representation of the stylus locate cycle 220 in FIG. 17.

The program then passes to the tracking loop 240 as shown in FIG. 16 and for which a timing diagram is shown in FIG. 17. Step 242 tracks the stylus X location, computing the offset distance in the X direction, followed by step 244 which tracks the stylus in a similar manner for the Y direction. In steps 242 and 244, the control processor 100 outputs over the I/O bus 108, the periodically updated horizontal and vertical position attributed to the stylus 60 with respect to the overlay 20. The program passes to step 246 which conducts another finger touch sensing operation in a manner similar to that described for step 206. In step 246, if a finger touch is sensed, step 248 has the control processor 100 outputting the coordinates of the finger touch on the I/O bus 108, in a manner similar to that described for step 208. Note that during each cycle of the tracking loop 240, horizontal and vertical coordinates representing the position attributed to the stylus 60 and horizontal and vertical coordinates attributed to the position of the finger touch can both be output, substantially simultaneously, by the control processor 100 to the I/O bus 108. In step 250, the control processor 100 determines whether the amplitude of the signal received by the stylus 60 is less than the threshold value for proximity detection. If the magnitude is greater than the threshold value, then the program passes to step 242, continuing the tracking loop cycle. If the magnitude of the signal detected by the stylus 60 is less than the threshold value, then the program passes back to the proximity loop 200 and restarts step 202 for the remote proximity stylus sensing operation. This is shown for the stylus tracking loop 240 as depicted in the timing diagram of FIG. 17.

Thus it is seen that in the second embodiment of the invention, the system can be operated so as to provide the simultaneous detection of both the pickup stylus 60 and a finger touch. This is depicted in FIG. 19, which is a view of the display as seen through the overlay 20, showing the simultaneous display of the touch cursor 270 whose location is produced by the host computer based upon the coordinates for the finger touch output over the I/O bus 108 by the control processor 100. Also depicted in FIG. 19 is the display of the stylus cursor 260, whose image is produced by the host processor, based upon coordinates for the stylus which are output over the I/O bus 108 by the control processor 100.

FIG. 18 depicts an example memory organization for the RAM 102 in the second embodiment of the invention, where the RAM 102 is connected by the processor bus 110 to the control processor 100, as is seen in FIG. 9. The RAM 102 can be partitioned into a sequence control routine which is a sequence of stored program instructions which carries out the operation depicted in the flow diagram of FIG. 16. The stylus proximity routine, the stylus locate routine and the stylus tracking routine are each a sequence of stored program instructions for carrying out the respective operations of proximity detection, location and tracking of the stylus, as previously described. A finger locate routine is a sequence of stored program instructions to carry out the operation of locating the coordinates of a finger touch, as previously described. Multiplex control registers and measurement control registers can be provided in the RAM 102. Optionally, a cursor shape table can be included in the RAM 102 to define the shape of the touch cursor 270 and the stylus cursor 260, or alternately the function of the cursor shape table can be carried out in the host processor. The X bus wire capacitance value file and the Y bus wire capacitance value file will provide temporary storage for the measured values of each of the respective 16 bus wires in the X bus 80 and the Y bus 90 during the finger touch sensing operations of steps 206, 226 and/or 246 of FIG. 16. After those stored capacitance values are processed by the control processor 100, the identity of the two bus wires in the X bus 80 and the two bus wires in the Y bus 90 corresponding to the maximum measured capacitance can be stored in the bus files partitioned in RAM 102 of FIG. 18. The finger X location table and the finger Y location table are also shown partitioned in the RAM 102. After the operation of the control processor 100 in conducting the table lookup for the X location and the Y location of the finger touch, the X and Y coordinates for the finger touch can be temporarily stored in the RAM 102 before being output over the I/O bus 108. Similarly, an X bus wire radiation value file and a Y bus wire radiation value file is provided for the temporary storage of measured values of radiation received by the stylus 60 corresponding to three bus wire pairs, as previously described. Bus file partitions, stylus X location and stylus Y location lookup tables, and array files are provided in the RAM 102 to facilitate the control processor 100 carrying out the stylus location and tracking operations. The final computed value for the X and Y coordinates of the stylus can then be temporarily stored in the RAM 102 before being output over the I/O bus 108, as previously described.

A utilization routine can also be included in a partition in the RAM 102, which consists of a sequence of stored program instructions for carrying out cooperative operations between the finger touch detection and stylus detection operations described above. For example, a utilization routine can be provided to identify when finger touches occur in a region vertically below the coordinates for stylus detection, with the finger touch being in an otherwise prohibited area. This may indicate that the user has rested the palm of his hand on the surface of the overlay 20 while positioning the stylus 60 at the desired point. The utilization routine can be selectively controlled to mask outputting the finger touch coordinates in such a situation, if desired by the operator.

The resulting combined finger touch and stylus detection system provides an enhanced man-machine interface, enabling either the sequential or simultaneous detection of both stylus position and finger touch, thereby increasing the range of applications for interactive input devices. The resulting invention has a reduced bus size and is adaptable for use with a variety of display types having both flat and convex display surfaces. The structure of the overlay permits low cost manufacture and long-term reliability.

Although specific embodiments of the invention have been disclosed, it will be understood by those having skill in the art that minor changes can be made to the form and details of the specific embodiments disclosed herein, without departing from the spirit and the scope of the invention.

What is claimed is:

1. A combined finger touch and stylus detection system for use on the viewing surface of a visual device, comprising:
   an array of horizontal and vertical conductors arranged on the viewing surface of the visual display device, having an I/O terminal coupled thereto, for conducting electrical signals between said terminal and the vicinity of said viewing surface;
   a radiative pickup stylus, having an output terminal, for receiving electromagnetic signals radiated from said array;
   a selection means having a switchable path connected to said I/O terminal of said array and having a control input, for connecting selected patterns of a plurality of said horizontal and vertical conductors to said switchable path in response to control signals applied to said control input;
   a capacitance measuring means having an input coupled to said switchable path of said selection means, for measuring the capacitance of selected ones of said conductors in said array, in response to said control signals applied to said control inputs;
   a radiative signal source having an output coupled to said switchable path of said selection means, for driving selected ones of said conductors in said array, in response to said control signals applied to said control input;
   a radiative signal measuring means coupled to said radiative pickup stylus, for measuring said electromagnetic signals received by said stylus;
   a control processor connected to said control input of said selection means, for executing a sequence of stored program instructions to sequentially output said control signals to said selection means;
   said control processor connected to said capacitance measuring means, for receiving measured capacitance values of said conductors when said selection means, in response to said control signals, has connected a first pattern of a plurality of said conductors in said array to said capacitance measuring means, to detect the location of a finger touch with respect to said viewing surface of said display device;
   said control processor connected to said radiative signal measuring means, for receiving measured radiative signal values when said selection means, in response to said control signals, has connected a second pattern of a plurality of said conductors in said array to said radiative signal source, to detect the location of said stylus with respect to said viewing surface of said display device;
   whereby, both finger touch location and stylus location with respect to said viewing surface of said display, can be detected.

2. The apparatus of claim 1, which further comprises:
   an overlay membrane upon which is mounted said array of horizontal and vertical conductors;
   a horizontal bus mounted on said overlay for interconnecting said vertical conductors to said I/O terminal of said array;
   said horizontal bus having a plurality of N bus wires and said vertical conductors being a plurality of no more than $N(N-1)/2$ vertical conductors;
   said plurality of vertical conductors being arranged with each adjacent conductor pair thereof being connected to a unique combination of two of said plurality of horizontal bus wires, the distance separating adjacent ones of said vertical conductors being approximately the width of a human finger tip;
   said control processor receiving from said capacitance measuring means, said measured capacitance values of two adjacent ones of said vertical conductors which are juxtaposed with said human finger tip, thereby detecting the horizontal location of said finger tip with respect to said viewing surface of said display.

3. The apparatus of claim 2, which further comprises:
   said plurality of vertical conductors being further arranged with each conductor of any group of a subplurality of adjacent conductors thereof being connected to a unique one of said N horizontal bus wires;
   said control processor controlling said selection means to connect selected ones of said vertical conductors in said group to said radiative signal source;
   said radiative pickup stylus, when proximate to said group, receiving electromagnetic signals radiated from said selected ones of said vertical conductors in said group, said received signals being distinguishable by said radiative signal measuring means over signals radiating from more distant ones of said vertical conductors located outside of said group in said array, thereby detecting the horizontal location of said stylus with respect to said viewing surface of said display.

4. The apparatus of claim 3, which further comprises:
a vertical bus mounted on said overlay for interconnecting said horizontal conductors to said I/O terminal of said array;
said vertical bus having a plurality of N bus wires and said horizontal conductors being a plurality of no more than N(N−1)/2 horizontal conductors;
said plurality of horizontal conductors being arranged with each adjacent conductor pair thereof being connected to a unique combination of two of said plurality of vertical bus wires, the distance separating adjacent ones of said horizontal conductors being approximately the width of a human finger tip;
said control processor receiving from said capacitance measuring means, said measured capacitance values of two adjacent ones of said horizontal conductors which are juxtaposed with said human finger tip, thereby detecting the vertical location of said finger tip with respect to said viewing surface of said display.

5. The apparatus of claim 4, which further comprises:
said plurality of horizontal conductors being further arranged with each conductor of any group of a subplurality of adjacent conductors thereof being connected to a unique one of said N vertical bus wires;
said control processor controlling said selection means to connect selected ones of said horizontal conductors in said group to said radiative signal source;
said radiative pickup stylus, when proximate to said group, receiving electromagnetic signals radiated from said selected ones of said horizontal conductors in said group, said received signals being distinguishable by said radiated signal measuring means over signals radiating from more distant ones of said horizontal conductors located outside of said group in said array, thereby detecting the vertical location of said stylus with respect to said viewing surface of said display.

6. The apparatus of claim 5, wherein N=16 and said subplurality is 8.

7. The apparatus of claim 5, which comprises:
said overlay membrane including an inner laminate and an outer laminate;
said inner laminate including an inner substrate consisting of a sheet of polyethylene terephthalate upon which is deposited said plurality of vertical conductors;
said plurality of vertical conductors being composed of a group consisting of indium tin oxide, gold and silver;
said inner laminate further including an insulation layer composed of vinyl acrylic polymer deposited over the surface of said vertical conductors, with a plurality of apertures therein selectively positioned over each of said vertical conductors;
said horizontal bus having said N bus wires composed of silver deposited on the surface of said insulation layer and penetrating through selected ones of said apertures in said insulation layer to make electrical contact with selected ones of said vertical conductors;
said outer laminate including an outer substrate consisting of a sheet of polyethylene terephthalate upon which is deposited said horizontal conductors and over which is deposited a second insulation layer including apertures therein exposing selected ones of said horizontal conductors, and further including said vertical bus having said N bus wires thereof formed by silver deposited on said second insulation layer and penetrating selected ones of said apertures therein to make electrical contact with selected ones of said horizontal conductors;
said inner laminate and said outer laminate being joined by an adhesive material, forming a unitary flexible transparent membrane.

8. The apparatus of claim 5, which further comprises:
said overlay membrane including an inner laminate and an outer laminate;
said inner laminate including an inner substrate consisting of a sheet of polyethylene terephthalate upon which is deposited said plurality of horizontal conductors;
said plurality of horizontal conductors being composed of a group consisting of indium tin oxide, gold and silver;
said inner laminate further including an insulation layer composed of vinyl acrylic polymer deposited over the surface of said horizontal conductors, with a plurality of apertures therein selectively positioned over each of said horizontal conductors;
said vertical bus having said N bus wires composed of silver deposited on the surface of said insulation layer and penetrating through selected ones of said apertures in said insulation layer to make electrical contact with selected ones of said horizontal conductors;
said outer laminate including an outer substrate consisting of a sheet of polyethylene terephthalate upon which is deposited said vertical conductors and over which is deposited a second insulation layer including apertures therein exposing selected ones of said vertical conductors, and further including said horizontal bus having said N bus wires thereof formed by silver deposited on said second insulation layer and penetrating selected ones of said apertures therein to make electrical contact with selected ones of said vertical conductors;
said inner laminate and said outer laminate being joined by an adhesive material, forming a unitary flexible transparent membrane.

9. A method for detecting either finger touch or stylus location in an overlay membrane having horizontal conductors and vertical conductors selectively connected to a capacitance measuring device, a radiative source, and further including a stylus pickup connected to a radiative signal measurement device for measuring the strength of electromagnetic signals radiated from the conductors on the overlay as picked up by the stylus, the steps comprising:
determining whether a finger touch threshold has been exceeded;
locating the finger touch if said touch threshold is exceeded;
determining whether a stylus threshold is exceeded, if said touch threshold was determined not to have been exceeded;
locating the position of the stylus if said stylus threshold has been exceeded;

repeating said step of determining whether said touch threshold has been exceeded, if said stylus threshold has not been exceeded;

whereby both finger touch and stylus detection can be alternately carried out for said overlay membrane.

10. A method for simultaneously detecting both finger touch location and stylus location on an overlay membrane including an array of horizontal conductors and vertical conductors which are selectively connected to a capacitance measuring means, a signal source, and which includes a stylus connected to a radiative pickup measurement means for measuring the electromagnetic radiation emitted by said conductors in said overlay and picked up by said stylus; the steps comprising:

cyclically detecting the remote proximity of the stylus from the overlay and detecting the finger touch on said overlay in a proximity loop;

passing control to a stylus location step to identify the coordinates for the location of said stylus with respect to said overlay, followed by sensing any possible finger touch to said overlay;

starting a tracking loop to cyclically update the coordinates for the location of said stylus with respect to said overlay and detecting any possible finger touch to said overlay;

repeating said tracking and said finger touch sensing steps in said tracking loop until the detected magnitude of said signals picked up by said stylus become less than a threshold value;

passing control to said proximity loop;

whereby coordinates for both stylus location and finger touch location on said overlay can be output during said locate cycle and said tracking loop.

* * * * *